United States Patent
Jaggi et al.

(10) Patent No.: US 7,505,687 B2
(45) Date of Patent: *Mar. 17, 2009

(54) DISTRIBUTED TERMINAL OPTICAL TRANSMISSION SYSTEM

(75) Inventors: Pawan Jaggi, Plano, TX (US); Marvin R. Young, Richardson, TX (US); William David Bragg, Plano, TX (US)

(73) Assignee: Pivotal Decisions LLC, Las Vegas, NV (US)

( * ) Notice: Subject to any disclaimer, the term of this patent is extended or adjusted under 35 U.S.C. 154(b) by 623 days.

This patent is subject to a terminal disclaimer.

(21) Appl. No.: 10/402,840

(22) Filed: Mar. 27, 2003

(65) Prior Publication Data

US 2003/0219255 A1 Nov. 27, 2003

Related U.S. Application Data

(60) Provisional application No. 60/368,545, filed on Mar. 29, 2002.

(51) Int. Cl.
H04J 14/02 (2006.01)
(52) U.S. Cl. .......................... 398/66; 398/83
(58) Field of Classification Search .............. 398/71, 398/72, 54, 66
See application file for complete search history.

(56) References Cited

U.S. PATENT DOCUMENTS

| | | | |
|---|---|---|---|
| 4,109,111 A | 8/1978 | Cook | 370/268 |
| 4,229,831 A | 10/1980 | Lacher | |
| 4,301,534 A | 11/1981 | Genter | 370/510 |
| 4,355,384 A | 10/1982 | Genter et al. | 370/372 |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |

(Continued)

FOREIGN PATENT DOCUMENTS

JP  01115230  5/1989

(Continued)

*Primary Examiner*—Leslie Pascal
(74) *Attorney, Agent, or Firm*—Woodcock Washburn LLP

(57) ABSTRACT

The invention facilitates optical signals generated from customer premise equipment (CPE) at the edges of the metro domain networks. The CPEs are connected to extension terminals that transform the optical signal originating at the CPE into a suitable format for long haul transmission. The optical signal then propagates to a primary terminal where the signal is multiplexed with other optical signals from other extension terminals. The multiplexed signals are then transmitted over LH or ULH network to a second primary terminal where the signal is then demultiplexed from other optical signals and transmited to the proper extension terminal. At the extension terminal, the demultiplexed optical signal is transformed from its LH format back into a format suitable for interconnection to a CPE. Using this architecture, the signal under goes optical-to-electrical conversion only at the extension terminals or end points. These end points can be located in lessee's facility. The only equipment located in lessor's facility is the primary terminal containing line amplifiers and add/drop nodes.

95 Claims, 13 Drawing Sheets

U.S. PATENT DOCUMENTS

| | | | |
|---|---|---|---|
| 5,559,625 A | 9/1996 | Smith et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |
| 5,903,613 A | 5/1999 | Ishida | |
| 5,914,794 A | 6/1999 | Fee | |
| 5,914,799 A | 6/1999 | Tan | |
| 5,936,753 A | 8/1999 | Ishikawa | |
| 5,940,209 A | 8/1999 | Nguyen | |
| 5,963,350 A | 10/1999 | Hill | |
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,075,634 A | 6/2000 | Casper et al. | |
| 6,078,414 A | 6/2000 | Iwano | |
| 6,081,359 A | 6/2000 | Takehana et al. | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 | 5/2001 | Berg et al. | |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,282,334 B1 | 8/2001 | Hodgson et al. | 385/12 |
| 6,288,811 B1 | 9/2001 | Jiang et al. | |
| 6,288,813 B1 | 9/2001 | Kirkpatrick et al. | |
| 6,307,656 B2 | 10/2001 | Terahara | |
| 6,307,986 B1 * | 10/2001 | Duerksen et al. | 385/24 |
| 6,317,231 B1 | 11/2001 | Al-Salameh et al. | |
| 6,317,255 B1 | 11/2001 | Fatehi et al. | |
| 6,323,950 B1 | 11/2001 | Kim et al. | |
| 6,327,060 B1 | 12/2001 | Otani et al. | |
| 6,327,062 B1 | 12/2001 | King et al. | |
| 6,339,663 B1 | 1/2002 | Leng et al. | |
| 6,341,186 B1 | 1/2002 | Singh et al. | 385/27 |
| 6,356,384 B1 | 3/2002 | Islam | |
| 6,359,729 B1 | 3/2002 | Amoruso | |
| 6,388,801 B1 | 5/2002 | Sugaya et al. | |
| 6,396,853 B1 | 5/2002 | Humphrey et al. | |
| 6,493,117 B1 | 12/2002 | Milton et al. | |
| 6,519,082 B2 | 2/2003 | Ghera et al. | |
| 6,546,166 B1 * | 4/2003 | Liu et al. | 385/24 |
| 6,587,470 B1 * | 7/2003 | Elliot et al. | 370/404 |
| 6,694,100 B1 * | 2/2004 | Fatehi et al. | 398/99 |
| 7,254,333 B2 * | 8/2007 | Shimizu | 398/79 |
| 7,308,197 B1 | 12/2007 | Zhong et al. | 398/48 |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1 | 8/2001 | Bottorff et al. | |
| 2001/0017722 A1 * | 8/2001 | Takachio et al. | 359/124 |
| 2001/0048799 A1 | 12/2001 | King et al. | |
| 2002/0008913 A1 | 1/2002 | Yin et al. | |
| 2002/0012152 A1 | 1/2002 | Agazzi et al. | |
| 2002/0015220 A1 | 2/2002 | Papernyl et al. | |
| 2002/0034197 A1 | 3/2002 | Tornetta et al. | |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |
| 2002/0171897 A1 * | 11/2002 | Cho et al. | 359/172 |
| 2003/0002776 A1 | 1/2003 | Graves et al. | |
| 2003/0067655 A1 * | 4/2003 | Pedersen et al. | 359/152 |
| 2006/0114939 A1 | 6/2006 | Singh | 370/469 |

FOREIGN PATENT DOCUMENTS

| | | |
|---|---|---|
| JP | 02238736 | 9/1990 |

* cited by examiner

DISTRIBUTED TERMINAL OPTICAL TRANSMISSION SYSTEM

CROSS-REFERENCE TO RELATED APPLICATIONS

This application claims priority to Provisional Application Ser. No. 60/368,545, entitled "Distributed Terminal Optical Network", by Jaggi, et al., filed Mar. 29, 2002.

FIELD OF THE INVENTION

This invention relates to a computer system for transporting optical signals between coupled metro domains using an optical transport networking system and more particularly using a lessor's optical transport networking system to transport a lessee's signal.

BACKGROUND OF THE INVENTION

The transmission, routing and dissemination of information has occurred over computer networks for many years via standard electronic communication lines. These communication lines are effective, but place limits on the amount of information being transmitted and the speed of the transmission. With the advent of light-wave technology, a large amount of information is capable of being transmitted, routed and disseminated across great distances at a high rate over fiber optic communication lines.

In traditional optical networks, long haul (LH) and ultra-long haul (ULH) optical networks typically connect major cities. The LH and ULH optical networks can span local geographical regions, countries, continents and even large bodies of water. The construction and maintenance costs of these long haul and ultra-long haul optical networks are prohibitively large. Because of these prohibitive costs, few communication service providers own their own optical networks. Many communication service providers lease the right to transmit optical signals over another communication service provider's optical network. The communication service providers that construct their national networks through the leasing of the optical networks from other communication service providers incur disadvantages, including increased cost, versus those communication service providers that own their own optical networks.

A typical communication service provider leasing "space" on another communication service provider's optical network must provide optical data networking equipment at their own local facilities in a metropolitan area and must also provide optical data networking equipment at the lessor's facility which may be in the same metropolitan area or a short distance away in another metropolitan area. In addition to the cost of maintaining multiple sets of optical data networking equipment, there is an additional penalty from the requirement to use metro transmission systems to connect the lessee communication system provider's facility to the lessor communication service provider's facility and then to use the LH and ULH optical data networking equipment to traverse the LH and ULH optical network. This system results in excessive optical-to-electrical conversions and increases the operational complexity of the overall systems.

What is needed is an optical transmission system that would locate all terminal equipment in the lessee's facility. It would also be beneficial if only line amplifiers and add/drop nodes were in the lessor's facilities. The signal should undergo optical-to-electrical conversion only at the end-points, preferably in the lessee's facility and at any regeneration points required by physical constraints.

SUMMARY OF THE INVENTION

The present invention provides an architecture and method for transmitting signals over a network which allows for all of lessee's equipment to be located at a extension terminal in lessee's facility. It allows for efficient optical-to-electrical conversions and does not require multiple sets of optical data networking equipment.

Prior art systems suffer from the limitation that a typical communication service provider leasing "space" must provide optical data networking equipment at their own local facilities and must also provide optical data networking equipment at the lessor's facility. In addition to the cost of maintaining multiple sets of optical data networking equipment, there is an additional penalty from the requirement to use metro transmission systems to connect the lessee communication system provider's facility to the lessor communication service provider's facility and then to use the LH and ULH optical data networking equipment to traverse the LH and ULH optical network. This system results in excessive optical-to-electrical conversions and increases the operational complexity of the overall systems. In addition, prior art systems suffer from the requirement to convert customer premise equipment signals into short haul format for transport to a facility, usually a lessor's, and then at the facility, to be converted into a LH format for transport over a LH network. Certain prior art systems have attempted to address these problems with varying success.

U.S. Pat. No. 5,726,784 to Alexander, et al., entitled WDM OPTICAL COMMUNICATION SYSTEM WITH REMODULATORS AND DIVERSE OPTICAL TRANSMITTERS, discloses an invention which is capable of placing information from incoming information-bearing optical signals onto multiple optical signal channels for conveyance over an optical waveguide. A receiving system is configured to receive an information bearing optical signal at a particular reception wavelength and each receiving system must include at least one Bragg grating member for selecting the particular reception wavelength. However, Alexander is intended to provide compatibility with existing systems and does not disclose or suggest a system that allows for efficient optical-to-electrical conversions or one that would locate all terminal equipment in the lessee's facility.

U.S. Pat. No. 5,613,210 to Van Driel, et al., entitled TELECOMMUNICATION NETWORK FOR TRANSMITTING INFORMATION TO A PLURALITY OF STATIONS OVER A SINGLE CHANNEL, discloses an invention which uses a method wherein a signal to be transmitted is modulated on a subcarrier having its own frequency and then modulated on a main carrier in each sub-station. While Van Driel does utilize subcarrier multiplexing, only two wavelengths are involved and the multiplexing is therefore limited. Van Driel does not disclose transmitting the signals over a LH network. Nor does Van Driel disclose or suggest a system that allows for efficient optical-to-electrical conversions or one that would locate all terminal equipment in the lessee's facility.

U.S. Pat. No. 5,559,625 to Smith, et al., entitled DISTRIBUTIVE COMMUNICATIONS NETWORK, discloses a method and system for increasing the amount of re-use of information transmission wavelengths within a network. A distributive communications network includes groups of nodes at different levels. At each level of nodes, wavelength traffic is either passed on to a higher level, or looped back according to the band of wavelengths to which it is assigned.

Philip does not disclose or suggest a system that allows for efficient optical-to-electrical conversions or one that would locate all terminal equipment in the lessee's facility.

Other patents such as U.S. Pat. No. 5,778,116 to Tomich, entitled PHOTONIC HOME AREA NETWORK FIBER/POWER INSERTION APPARATUS, and U.S. Pat. No. 5,914,799 to Tan, entitled OPTICAL NETWORK disclose an invention that is limited to signal transfer from a central station to subscriber stations. Neither of the patents disclose a method or apparatus for transmitting signals over a LH network, disclose or suggest a system that allows for efficient optical-to-electrical conversions or one that would locate all terminal equipment in the lessee's facility.

The present invention is an improvement over the prior art because it allows for efficient optical-to-electrical conversions and does not require multiple sets of optical data networking equipment. The present invention provides for coupled metro domain networks which are a part of a larger inter-domain network. The invention facilitates optical signals generated from customer premise equipment (CPE) at the edges of the metro domain networks. The CPEs are connected to extension terminals preferably in lessee's facility. The extension terminals transform the optical signal originating at the CPE into a suitable format for long haul transmission. One or more CPEs may be connected to one or more extension terminals. The optical signal then propagates from an extension terminal to a primary terminal along a metro fiber. At the primary terminal, the optical signal is multiplexed with other optical signals from other extension terminals. The multiplexed signals are then transmitted over LH or ULH network to a second primary terminal via core fiber. The optical signal may propagate along the core fiber with the help of a chain of amplifiers and optical add/drops. The second primary terminal then demuxes the optical signal from other optical signals and transmits the demuxed signal to the proper extension terminal. At the extension terminal, the demuxed optical signal is transformed from its LH format back into a format suitable for inter-connection to a CPE. Using this architecture, the signal under goes optical-to-electrical conversion only at the extension terminals. These extension terminals can be located in lessee's facility. The only equipment located in lessor's facility is the primary terminal containing line amplifiers and add/drop nodes. The transport system meets the networking requirements of intercity connections without the need for complex and costly metro transport gear. Also, the core extension terminals may be physically distributed across several metro network nodes.

The invention will be better understood from the following more detailed description taken in conjunction with the accompanying drawings.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

Figure 1:
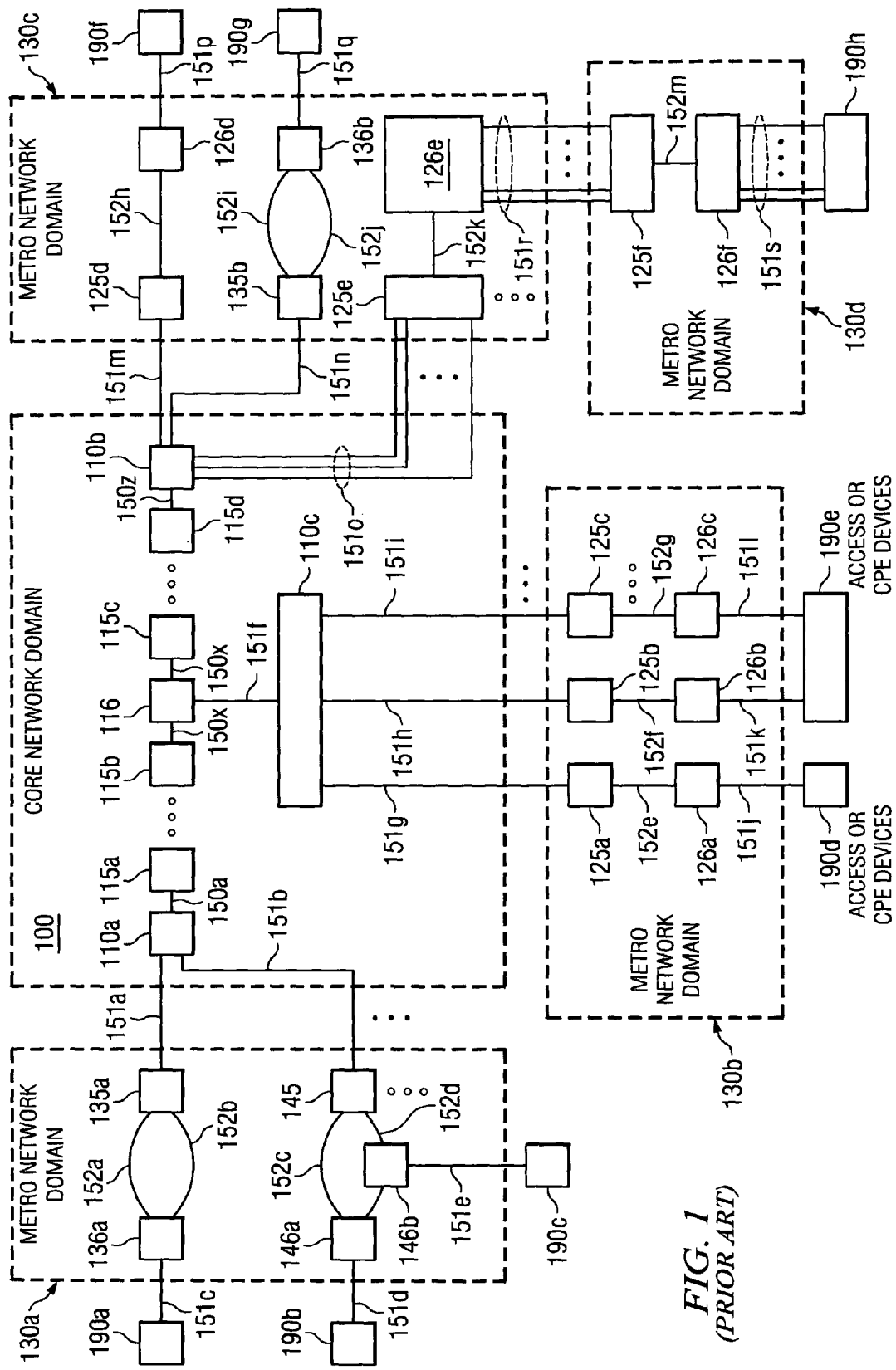
FIG. 1 is a block diagram depicting a prior art inter-domain optical networking between core networks and metro/regional networks.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness. Reference of an A-Z signal or direction means from the left side of the drawing to the right side of the drawing while Z-A means from the right side to the left side. The A-Z or Z-A designation is used for illustrative purposes only.

Figure 2:
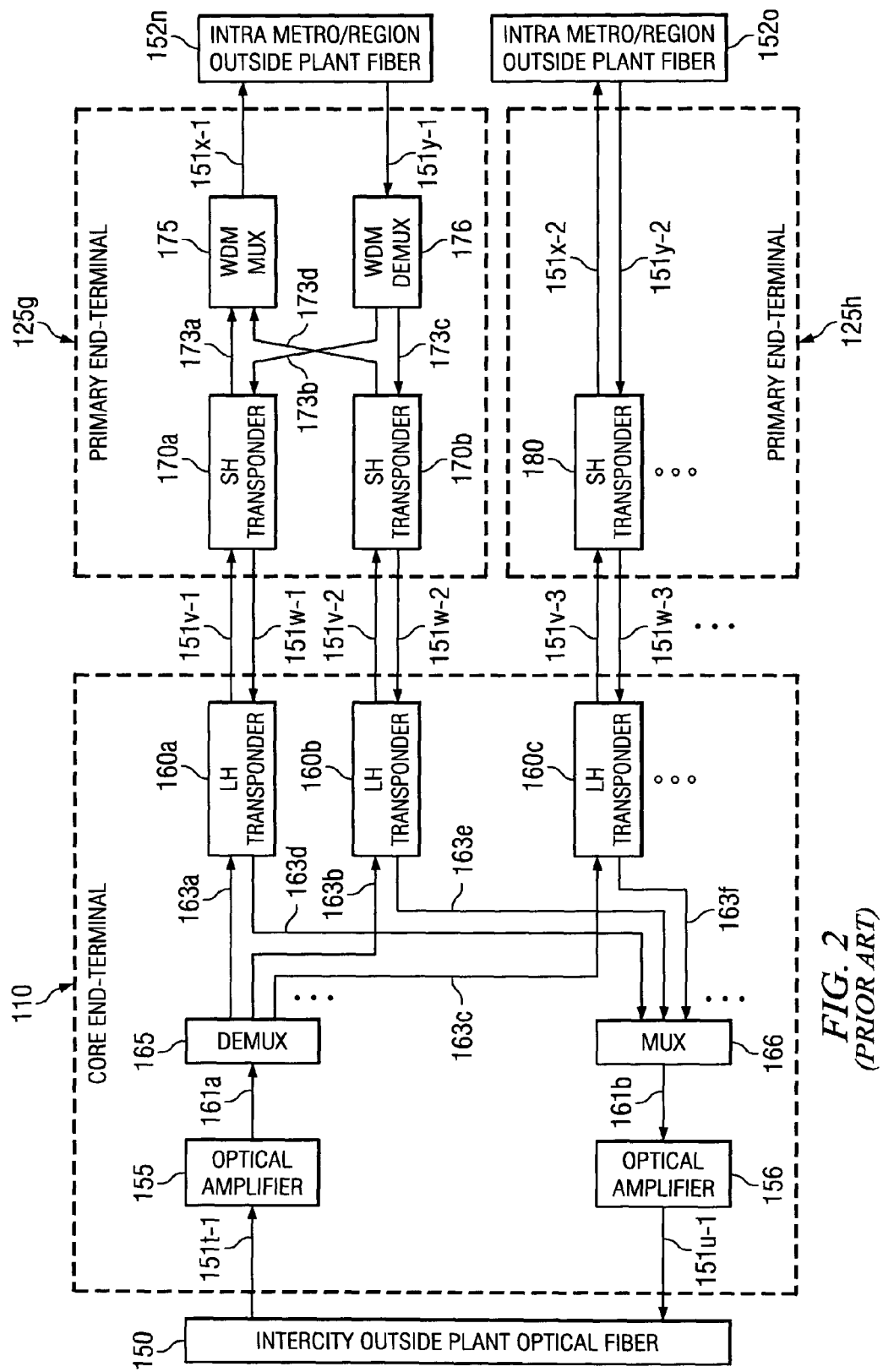
FIG. 2 is a block diagram of the detail of the prior art end-terminals and the interconnections between optical transport systems in FIG. 1.

The prior art as it relates to optical transport networking between domains is shown in FIG. 1 and FIG. 2. Referring to FIG. 1, an optical transport network may be composed of several domains: a core network 100 with a geographic extent of typically between 100 km and 1500 km and a plurality of metro network domains 130a-d with geographic extents typically of 3 km to 100 km.

Customer premise equipment (CPE) 190a-h are considered to be outside metro domains 130a, 130b, 130c, and 130d. CPE 190a-h is sometimes referred to as client equipment or end-user equipment. CPE 190a-h are connected to metro domain 130a-d via interoffice fiber, 151c, 151d, 151e, 151j-l, and 151p-s.

Metro domains 130a-d vary widely in extent, interconnection, and in the types of systems that are deployed within them. Metro domain 130a shows a plurality of ring-protected systems. Metro domain 130a is composed of primary ring end terminal 135a, extension ring end terminal 136a, primary multi-node terminal 145, and extension multi-node terminals 146a and 146b. Optical signals are propagated to and from primary ring end terminal 135a and extension ring end terminal 136a on metro fibers 152a and 152b. Optical signals may propagate on either or both legs of the ring so that in the event fiber 152a or fiber 152b fails, a connection is continually maintained between primary ring end terminal 135a and extension ring end terminal 136a.

A more complex, multi-node protected ring is indicated by primary multi-node ring end terminal 145 and extension multi-node ring end terminals 146a and 146b, whereby, all three nodes are interconnected via metro fiber 152c and 152d. Metro fiber 152c and 152d may be a single fiber or a plurality of fibers. Methods for ring protection are well known in the art and will not be discussed further.

Metro domain 130b is different from metro domain 130a in that metro domain 130b consist of primary end terminals 125*a-c* and extension end terminals 126*a-c* being connected by metro fiber 152*e-g* in a linear fashion as opposed to a ring protected system as shown in metro domain 130*a*. Metro domain 130*b* provides a network consisting of a plurality of unprotected linear links where the optical signals are propagated along a single path of fiber in an unprotected way. For example, if metro fiber 152*e* is cut or fails, then optical signals terminating at and originating from CPE 190*d* will no longer be connected with core end terminal 110*c*. By the interconnection of CPE 190*e* to extension end terminals 126*b* and 126*c* and extension end terminals 126*b* and 126*c* being connected to core end-terminal 110*c* via primary end terminal 125*b* and 125*c* an economical path protection can be realized at the client equipment layer. Path protection at the client equipment layer is realized because if one interconnection of CPE 190*e* to either extension end terminal 126*b* or 126*c* fails, the other interconnection can still transmit signals to 110*c*.

Metro domain 130*c* indicates a combination of protected and unprotected links. Primary end terminal 125*d* is connected to extension end terminal 126*d* in a linear fashion via fiber 152*h*. Primary end terminal 135*b* is connected to extension end terminal 136*b* in a ring-protected system via fibers 152*i* and 152*j*. Primary end terminal 125*e* is connected to extension end terminal 126*e* via metro fiber 152*k*. Core end terminal 10*b* is ultimately connected to CPE 190*h* by the transiting link of primary end terminal 125*f* and extension end terminal 126*f* in domain 130*d* via fiber 152*m* and by the transiting link of primary end terminal 125*e* and extension end terminal 126*e* in domain 130*c* via fiber 152*k*. Secondary end terminal 126*e* is connected to primary end terminal 125*f* via multiple fiber 151*r*. Such architecture may occur, for example, because the geographical distance between core end terminal 110*b* and CPE 190*h* is too large for one domain. More relevant to this invention, the situation may occur because different entities own and manage the two domains 130*c* and 130*d* and there is no way to connect domain 130*d* to core end-terminal 110*b* without some type of intermediate equipment and associated fiber.

Metro systems may multiplex more than one optical signal onto a single fiber using methods that are well known in the art as such as code wave division multiplexing (CWDM), wavelength division multiplexing (WDM), or dense wavelength division multiplexing (DWDM) methods. Starting from core end-terminal 110*b* in the core network 100, a plurality of tributary signals are interconnected and terminated on primary end terminal 125*e* via multiple fiber 151*o*. Primary end terminal 125*e* muxes the plurality of tributary signals together and transmits the muxed signals to extension end terminal 126*e* via metro fiber 152*k*. Secondary end terminal 126*e* demuxes the plural tributary signals and transmits them via multiple pairs of intra-office fibers 151*r* to primary end terminal 125*f* in domain 130*d*. Primary end terminal 125*f* muxes the plurality of tributary signals together and transmits the muxed signals to extension end terminal 126*h* via metro fiber 152*m*. Finally, extension end terminal 126*h* demuxes the plural tributary signals and connects them, via multiple intra-office fibers 151*s* to CPE 190*h* where the signals terminate. If the signals originated at CPE 190*h* the process would be reversed.

Core network 100 is sometimes referred to as a long haul network and may be composed of a plurality of linear DWDM systems or more complex ring structures employing SONET ADMs or a mix of each type. A linear DWDM system is shown in FIG. 1. Signals are transferred into and out of core network 100 by core end terminals 110*a-c* via intra-office fiber 151*a*, 151*b*, 151*f-i*, and 151*m-o*. The tributary interfaces will be described in more detail in FIG. 2 as are the methods used to transmit signals through the core end terminals 110*a-c*. The transmitted signals from one core end terminal 110*a-c* propagate through a set of core optical amplifiers 115*a-d* and optical add-drop multiplexing device (OADM) 116 on core fiber 150*a*, 150*x*, and 150*z* before reaching a second core end terminal 110*a*, 110*b*, and 110*c* where the signals are transmitted into a metro network domain 130*a-d*.

Core amplifiers 115*a-d* perform the function of compensating for loss of optical signal power as the optical signals propagate through core fiber 150*a*, 150*x*, and 150*z*. The amplifiers are spaced typically 60 km to 120 km apart. The ellipsis in the drawing indicates that there could be any number amplifiers between 115*a* and 115*b* and between 115*c* and 115*d*. Also, there may be more than one OADM along core fiber 150*a*, 150*x* and 150*z*. OADM 116 performs the function of extracting and inserting optical signals from core fiber 150*a*, 150*x* and 150*z*, and placing or acquiring the signals on or from intra-office fiber 151*a*, 151*b*, 151*f-i*, and 151*m-o*.

In FIG. 2, the details of signals paths from core fiber 150 (shown as a block), core end terminal 110, primary end terminals 125*g* and 125*h*, to the metro fiber 152*n* and 152*o* (shown as blocks) are shown. These signals paths occur between, for example, 110*c* and 125*a-c* in FIG. 1. With the exception of core fiber 150 and metro fiber 152*n* and 152*o*, all the elements of FIG. 2 are physically co-located in a metro central office (CO) or a core network point-of-presence (POP) facility. Moreover, typically all end-terminal components in core end terminal 110 and metro terminal 125*g* and 125*k* must be co-located in the same facility and within adjacent bays according to prior art.

Continuing in FIG. 2, intra-office fibers usually consist of a fiber pair, for example intra-office fiber 151*t*-1 and 151*u*-1, whereby the transmit and receive optical signals usually propagate on separate fibers. Optical or WDM signals from core fiber 150 enter core end terminal 110 via intra-office fiber 151*t*-1. Intra-office fiber 151*t*-1 is connected to optical amplifier 155 where the propagating signals are amplified. Optical amplifier 155 is further connected to DWDM demux 165 via core end terminal fiber 161*a*. Core end terminal fiber 161*a* carries composite optically muxed signals. The composite signals are deconstructed into their constituent and individual optically modulated signals by DWDM demux 165 and appear on fiber interconnects 163*a-c*. Optical signals on fiber interconnects 163*a-c* are received by Long Haul (LH) transponders 160*a-c*. LH transponders 160*a-c* electrically process and optically remodulate the signals, and transmit the LH remodulated signals through tributary interfaces 151*v*-1 and 152*v*-2 to short haul (SH) transponders 170*a* and 170*b* or SH transceiver 180 via intra-office fibers 151*v*-3.

LH transponders 160*a-c* may be varied in their capability and composition. For example, they may employ internal modulation or external modulation using NRZ, RZ, or other formats as known by those skilled in the art. LH transponders 160*a-c* have the primary function of converting short and intermediate reach intra-office signals typically generated by directly modulated lasers to long reach signals; long reach signals (LH format) being compatible with intercity propagation of hundreds or thousands of kilometers.

The SH transponders 170*a* and 170*b* and SH transceiver 180 may be of different varieties typically found in metro domain systems and known well to those skilled in the art. The distinguishing feature of SH transponder 170*a* and 170*b* and SH transceiver 180 from LH transponders 160*a-c* is in the propagation distance limitation on the SH transponders 170*a* and 170*b* and SH transceiver 180. SH transponders 170*a* and 170*b* and SH transceiver 180 have a propagation distance limited to less than or about 80 km.

The term transponder applies to both the LH and SH applications wherein the input optical signal to the device is narrow band and occurs at a particular input wavelength or frequency and wherein the device converts the input signal to an output optical signal of a different wavelength or frequency and may be narrowband or broadband in nature. In general, a transponder will operate in full-duplex mode. The term transceiver applies to a device that converts input signals at a particular wavelength or frequency to an output signal at the same wavelength or frequency while maintaining similarity between the optical bandwidth and dispersive capacity of the input signal to the optical bandwidth and dispersive capacity of the output signal.

Both LH and SH devices perform the functions of regeneration or amplification and reshaping, and may or may not employ retiming. Further details of the LH or SH receiver technology and transmitter technology, that is the transponders and transceivers, are known in the art and will not be described further. Continuing the description of FIG. 2, the optical signals on intra-office fibers 151$v$-1, 151$v$-2, and 151$v$-3 are received by SH transponders 170$a$ and 170$b$ and SH transceiver 180. The optical signals on 151$v$-3 are converted by transponder 180 to optical signals that propagate directly on the intra-office fibers 151$x$-2 to metro fiber 152$o$. Alternatively, the optical signals appearing on intra-office fiber 151$v$-1 and 151$v$-2 are converted by SH transponders 170$a$ and 170$b$, respectively, to intermediate signals and transmitted to WDM mux 175 via fiber interconnect 173$a$ and 173$d$, respectively. WDM mux 175 muxes the intermediate signals and transmits them to the metro fiber 152$n$ via intra-office fiber 151$x$-1 and ultimately to a extension end terminal.

In the Z-A direction, optical signals from metro fiber 152$n$ propagate along intra-office fiber 151$y$-1 to WDM demux 176. WDM demux 176 extracts the optical signals propagated along intra-office fiber 151$y$-1, and transmitts the extracted signals to SH transponders 170$a$ and 170$b$ via interconnects 173$b$ and 173$c$. SH transponders 170$a$ and 170$b$ electronically process and optically remodulate the extracted signals for transport over a SH network and transmit the remodulated signals to LH transponders 160$a$ and 160$b$ via intra-office fibers 151$w$-1 and 151$w$-2. LH transponders 160$a$ and 160$b$ convert the signals for into a format suitable for LH transporting and transmits the prepared signals to DWDM mux 166 via fiber interconnects 163$d$ and 163$e$.

Optical signals from metro fiber 152$o$ propagate along intra-office fiber 151$y$-2 to SH transceiver 180. SH transceiver 180 electronically processes and optically remodulates the extracted signals for transport over a SH network and transmits the remodulated signal to LH transponder 160$c$ via intra-office fiber 151$w$-3 and tributary interface 155$c$. LH transponder converts the signal into a format suitable for LH transporting and transmits the prepared signal to DWDM mux 166 via fiber interconnect 163$f$.

DWDM mux 166 muxes the signals received from fiber interconnects 163$d$-$f$ and transmits the muxed signals to transmitting optical amplifier 156 via core end terminal fiber 161$b$. Transmitting optical amplifier 156 amplifies the muxed signals and transmits the amplified signals to core fiber 150 via intra-office fiber 151$u$-1.

Figure 3:
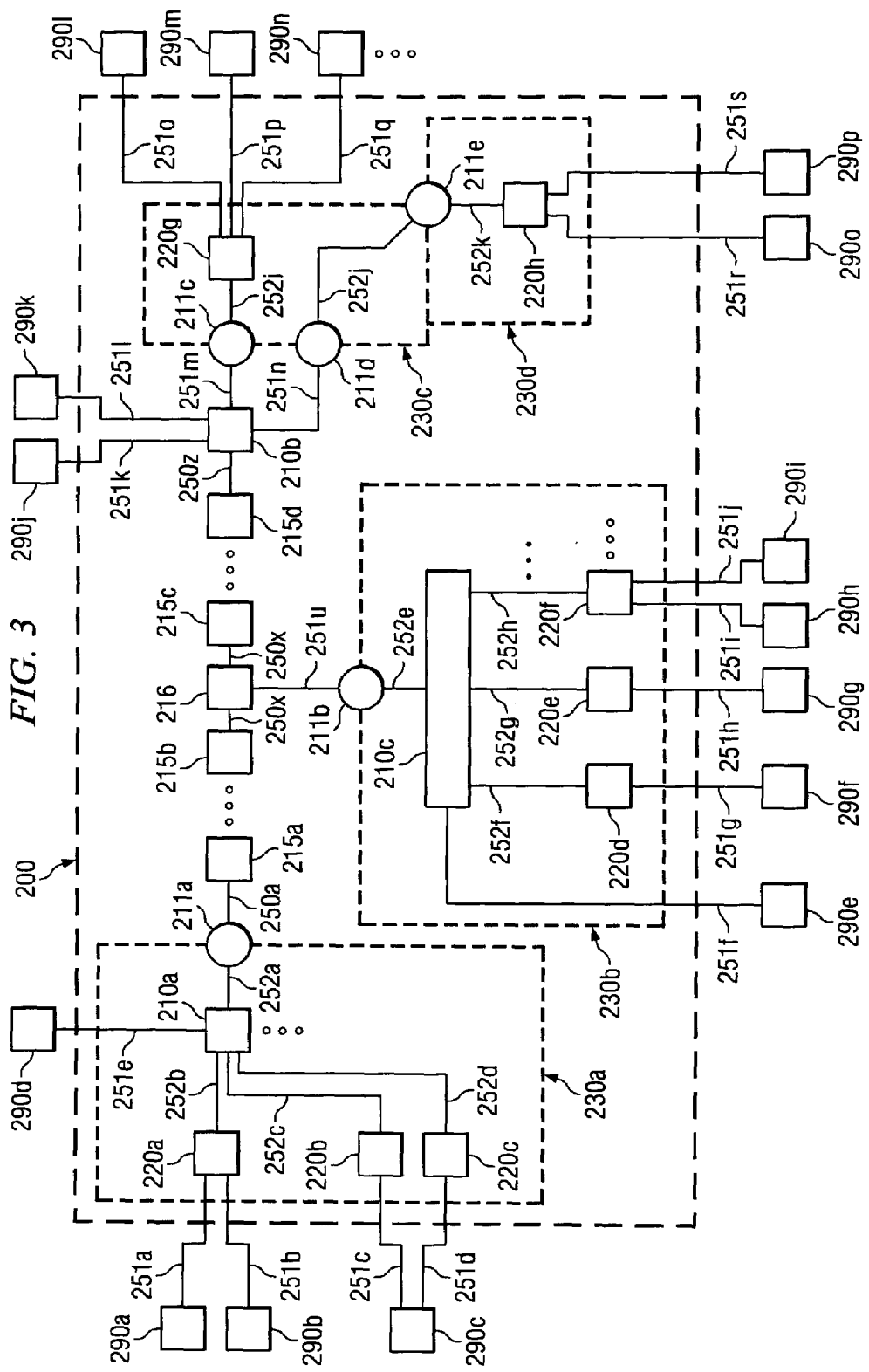
FIG. 3 is a block diagram depicting an inter-domain optical transport system according to the present invention.

The preferred and alternate embodiments of the invention are described with reference to FIGS. 3-12. Beginning with FIG. 3, the invention includes a set of coupled metro networks 230$a$-$d$ which are a part of a larger inter-domain network 200. The metro networks 230$a$-$d$ are connected by a plurality of linear DWDM systems or more complex ring structures employing SONET ADMs or a mix of each type. A linear DWDM system is shown in FIG. 3, but the invention encompasses other structures. The invention facilitates optical signals generated from CPE 290$a$-$p$ at the edges of metro networks 230$a$-$d$ to be interconnected directly with each other. CPEs 290$a$-$p$ are the same type as CPEs 190$a$-$h$ shown in FIG. 1. Those skilled in the art will recognize that the configuration of metro network domains may take many forms and that those depicted are exemplary. Similarly, the invention can be applied to a widely varying arrangement of interconnections of metro optic networks, as will be appreciated by those skilled in the art. CPEs 290$a$-$d$, 290$f$-$i$ and 290$l$-$p$ are in communication with extension terminals 220$a$-$h$ via intra-office fiber 251$a$-$d$, 251$g$-$i$ and 251$o$-$s$. Intra-office fibers 251$a$-$s$ are the same type of fiber as intra-office fibers 151$a$-$s$ shown in FIG. 1. CPE 290$d$ is connected to primary terminal 210$a$ via intra-office fiber 251$e$. CPE 290$e$ is connected to primary terminal 210$c$ via intra-office fiber 251$f$. CPEs 290$j$ and 290$k$ are connected to primary terminal 210$b$ via intra-office fibers 251$k$ and 251$l$.

Extension terminals 220$a$-$f$ are connected to primary terminals 210$a$ and 210$c$ via metro fiber 252$b$-$d$ and 252$f$-$h$. Metro fiber 252$a$-$k$ is the same type of fiber as metro fiber 152$a$-$m$. Primary terminals 210$a$ and 210$c$ are connected to junctions 211$a$ and 211$b$ via metro fiber 252$a$ and 252$e$. Extension terminal 220$g$ is connected to junction 211$c$ via metro fiber 252$i$. Extension terminal 220$h$ is connected to junction 211$e$ via metro fiber 252$k$. Junction 211$e$ is connected to junction 211$d$ via metro fiber 252$j$. Junction 211$a$ is connected to core amplifier 215$a$ via core fiber 250$a$. Amplifiers 215$a$-$d$ are the same type of amplifiers as 115$a$-$d$. Core fiber 250$a$, 250$x$ and 250$z$ is the same type of fiber as core fiber 150$a$, 150$x$ and 150$z$.

Junction 211$b$ is connected to OADM 216 via interoffice fiber 251$u$. Junctions 211$c$ and 211$d$ are connected to primary terminal 210$b$ via intra-office fiber 251$m$ and 251$n$. Also connected to primary terminal 210$b$ are CPE 290$j$ and 290$k$ through intra-office fiber 251$k$ and 251$l$.

To accomplish the interconnection of metro networks 230$a$, 230$b$, 230$c$, 230$d$, core optical amplifiers 215$a$-$d$ are connected to OADM 216 via core fiber 250$a$, 250$x$ and 250$z$. The ellipses in the drawing indicate there can be any number of core amplifiers 215$a$-$d$ between junction 211$a$ and OADM 216 and between primary distributed terminal 210$b$ and OADM 216. Also, there may be more than one OADM 216 along core fiber 250$a$, 250$x$ and 250$z$. Either OADM 216 or core amplifiers 215$a$-$d$ are connected to a sub-system of primary terminals 210$a$-$c$ and extension terminals 220$a$-$h$ composed of terminal shelves. CPE 290$a$-$p$ may be interconnected directly to primary terminals 210$a$-$c$ or extension terminals 220$a$-$h$ to accomplish the transfer of optical signals from a particular CPE to a different CPE that may be in a geographically distinct location. OADM 216 can be fixed or not fixed as in broadcast and select architectures. In the preferred embodiment, OADM 216 includes a broadcast and select architecture as is known in the art. Core optical amplifiers 215 and OADM 216 may or may not contain components to perform optical dispersion compensation and other components to perform gain equalization, both of which may employ techniques known in the art.

Referring to FIG. 3, a link between CPE 290$a$ and CPE 290$p$ in the A-Z direction of a full-duplex signal path will now be described as an example. CPE 290$a$ is connected to extension terminal 220$a$ via intra-office fiber 251$a$. Extension terminal 220$a$ transforms the signal originating at 290$a$ into a suitable format for LH transmission. Extension terminal 220$a$ transmits the transformed signal to primary terminal 210$a$ via metro fiber 252$b$. At primary terminal 210$a$, the transformed signal is optically muxed with other signals from extension terminals 220*b* and 220*c* and with signals generated at CPE 290*d*. The multiplexed signals are transmitted to junction 211*a* via metro fiber 252*a*. At junction 211*a*, metro fiber 252*a* is connected to core fiber 250*a* and the optical signal propagates along core fiber 250*a*, 250*x* and 250*z* through the chain of core amplifiers 215*a-d* and OADM 216 to the primary distributed terminal 210*b*. At primary distributed terminal 210*b*, the desired signal for CPE 290*p* is optically demuxed from the other signals and transmitted along intra-office fiber 251*n* to junction 211*d*. At junction 211*d*, intra-office fiber 251*n* is coupled to metro fiber 252*j*. The desired optical signal propagates along metro fiber 252*j* to junction 211*e*. At junction 211*e*, metro fiber 252*j* is coupled to metro fiber 252*k*. The desired optical signal continues to propagate on metro fiber 252*k* to extension terminal 220*h*. At extension terminal 220*h*, the desired optical signal is received and transformed from its LH format into a format suitable for interconnection with CPE 290*p* through intra-office fiber 251*s*. The optical signal terminates at CPE 290*p*. In the Z-A direction of the full duplex signal can be described in a similar way, so that signals originating from CPE 290*p* and terminating at CPE 290*a* are propagated in a similar manner.

There are many optical links that can be established in the inter-domain network 200. For example, the present invention allows for CPE 290*c* to be interconnected to any one of the other CPE shown in FIG. 3. Also, more than one CPE may be connected to a single extension terminal or primary terminal. For example, CPE 290*a* and CPE 290*b* are both connected to extension terminal 220*a*. CPE 290*a* and 290*b* may be co-located together or geographically separate and neither CPE 290*a* or 290*b* need be co-located with extension terminal 220*a*. Although in practice they are usually co-located and interconnected by intra-office fiber 251*a* and 251*b* as shown. Additionally, one CPE may be connected to a plurality of extension terminals or primary terminals. For example, CPE 290*c* is shown having at least two distinct optical interfaces, one being connected to extension terminal 220*b* and the other connected to extension terminal 220*c*. By interconnecting extension terminals 220*b* and 220*c* to primary terminal 210*a* with metro fiber 252*c* and 252*d*, a protected connection can be made between CPE 290*c* and primary terminal 210*a*. If a fiber failure occurs on either metro fiber 252*c* or 252*d* the other metro fiber 252*c* or 252*d* may carry the optical signals safely from CPE 290*c* to other points in inter-domain network 200.

Another link example will illustrate further features of the current invention. Simultaneous multiple interconnections between metro networks 230*b* and 230*c* consisting of links between CPE 290*e* to CPE 290*o*, CPE 290*h* to CPE 290*k*, and CPE 290*i* to CPE 290*p* is described. In particular, CPEs 290*h* and 290*i* are connected to extension terminal 220*f* via intra-office fiber 251*i* and 251*j*, respectively. Secondary terminal 220*f* converts the originating signals from CPEs 290*h* and 290*i* to a LH format. Secondary terminal 220*f* optically muxes the converted signals and transmits the muxed signals to primary terminal 210*c* via metro fiber 252*h*. Also, CPE 290*e* is connected to primary terminal 210*c* via intra-office fiber 251*f* and transmits an SH signal to primary terminal 210*c*.

At primary terminal 210*c*, the optical signal originating from CPE 290*e* is converted to a LH format and optically muxed with the other optical signals originating from extension terminal 220*f*. The muxed optical signals from primary terminal 210*c* propagate on metro fiber 252*e* to junction 211*b*. The signals propagate through junction 211*b* to intra-office fiber 251*u* and continues on to OADM 216. OADM 216 muxes the signals from intra-office fiber 251*u* onto core fiber 250*x*. The optical signals propagate on core fiber 250*x* and 250*z* towards primary terminal 210*b*. Multiple core amplifiers 215*c* and 215*d* may be used to boost the signal. Additional OADMs 216 may also be present on core fiber 250*x* and 250*z*.

At primary terminal 210*b*, the optical signals on core fiber 250*z* are optically demuxed in such a way that optical signals destined for CPE 290*e* and CPE 290*i* are transmitted on intra-office fiber 251*n* while optical signals destined for CPE 290*h* are transmitted on intra-office fiber 251*l*. The signal on intra-office fiber 251*l* terminates at CPE 290*k* and the signal from CPE 290*h* has been successfully transmitted to CPE 290*k*. CPE 290*k* is considered local to core distributed terminal 210*b*.

The signals originating from CPE 290*e* and CPE 290*i* on intra-office fiber 251*n* propagate along intra-office fiber 251*n* through junction 21 ld and onto metro fiber 252*j* inside metro network 230*c*. The LH signals propagate along metro fiber 252*j* through junction 211*e* and onto metro fiber 252*k* inside metro network 230*d*. The optical signals propagate along metro fiber 252*k* to extension terminal 220*h*. At extension terminal 220*h*, the optical signals are demuxed and converted from a LH format to a format suitable for interconnection to CPEs 290*o* and 290*p*. The converted signals are transmitted to CPEs 290*o* and 290*p* via intra-office fiber 251*r* and 251*s*, respectively, where the signals terminate. The signal from CPE 290*e* has been successfully transmitted to CPE 290 and the signal from 290*i* has been successfully transmitted to 290*p*. In the Z-A direction of the full duplex signal can be described in a similar way so that originating signals from 290*k*, 290*r*, and 290*q* destined for 290*h*, 290*e*, and 290*i* respectively, are propagated in a similar manner to that just described.

The above explains how a signal may propagate through more than one metro network 230 without conversion from an LH format. In the preferred embodiment, the links between primary terminals 210*a-c* and extension terminals 220*a-h* may be more than 100 km and may include optical amplifiers with or without dispersion compensators and gain equalizers.

The invention allows for primary terminals 210*a-c* to be placed outside or within a metro network 230 as required by the location of CPEs 290*a-p*. Primary terminals 210*a* and 210*c* are inside respective metro networks 230*a* and 230*b* while primary terminal 210*b* is outside metro networks 230*c* and 230*d*.

The invention also allows for remote interconnections between OADM 216 and primary terminals 210*a-c* to be of distances greater than those found in most interoffice networks. The distance for the remote interconnection is similar in nature to the long distances between primary terminals 210*a-c* and extension terminals 220*a-p* and could be around 100 km. Interconnection between primary terminals 210*a-c*, extension terminals 220*a-h* and OADM 216 are accomplished with a single pair of fibers. This feature is further described in relation to FIG. 4.

Figure 4:
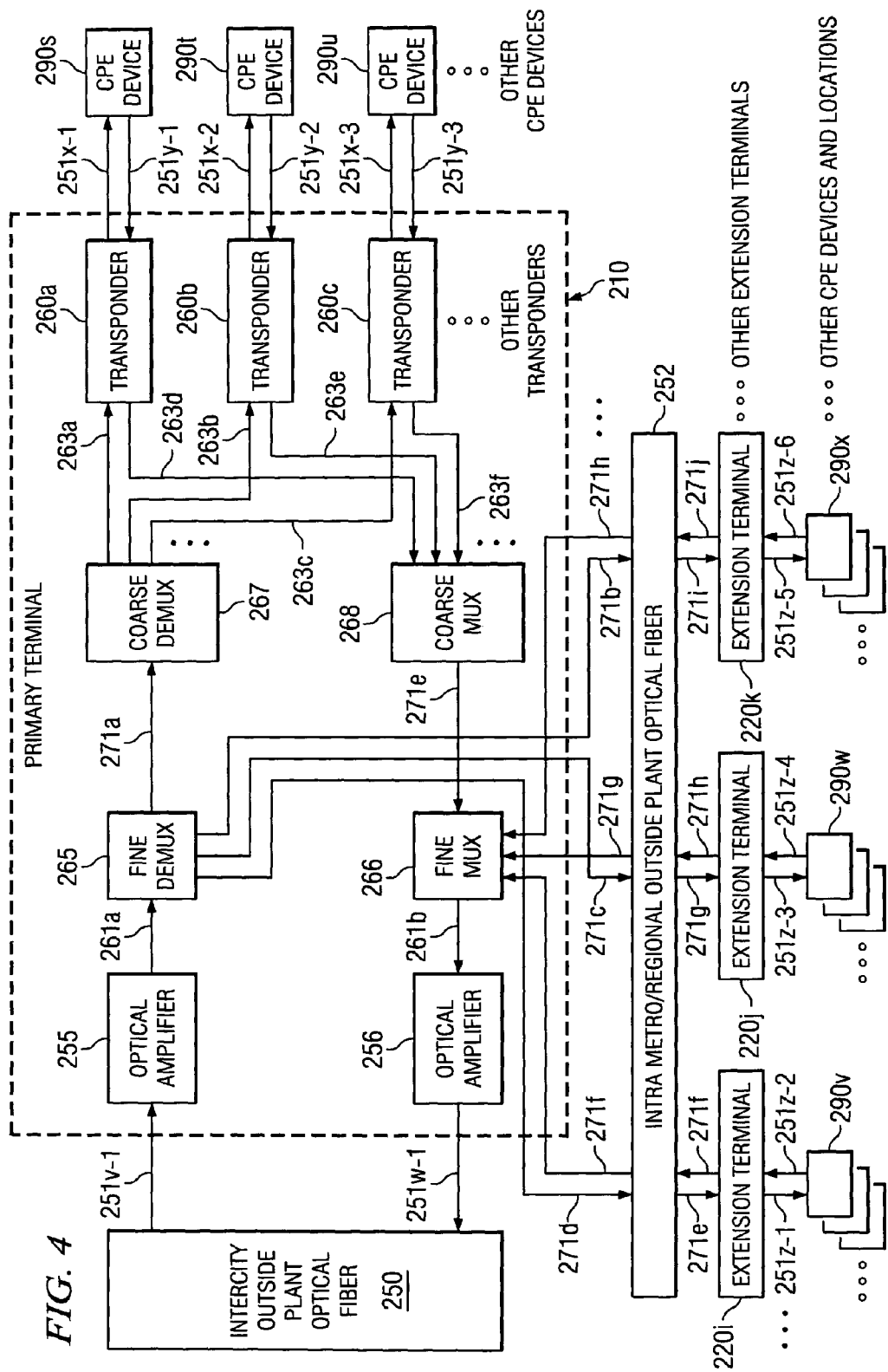
FIG. 4 is a block diagram of the detail of a primary terminal for use in the present invention.

FIG. 4 depicts the preferred embodiment of a primary terminal. Primary terminal 210 allows for the interconnection of full duplex signals from core fiber 250 (shown as a block) to various distinct CPEs 290*s-x*. CPEs 290*s-x* are the same type as CPEs 290*a-p* FIG. 3 and CPEs 190*a-h* FIG. 1. CPEs 290*s-x* may be geographically diverse from one another. In the A-Z direction, an LH format optical signal is transmitted from the core fiber plant 250 to receiving amplifier 255 via intra-office fiber 251*v*-1. Intra-office fibers 251*v-a*, 251*x*-1, 251*x*-2, 251*x*-3, 251*y*-1, 251*y*-2, 251*y*-3, 251*z*-1, 251*z*-2, 251*z*-3, 251*z*-4, 251*z*-5, 251*z*-6, 251*w*-1 are the same type of fiber as intra-office fibers 251*a-s* and 151*a-s*. Receiving amplifier 255 performs the function of amplifying the incoming multiplexed WDM or DWDM signals from intra-office fiber 251v-1 to a known level, so the signal has enough optical power to transmit to other components such as extension terminals 220i-k. The amplified signal is transmitted to fine demux 265 via fiber 261a. The signal can contain any number of muxed optical signals. In the preferred embodiment, there are twelve optical signals, referred to as M (12) to denote any arbitrary number of twelve signals.

Fine demux 265 demuxes the M (12) muxed signals in such a way as to leave N (4) smaller groups of M/N (3) optical signals. The N (4) smaller groups are muxed onto 4 intra-office fiber interconnections 271a-d. These smaller groups of approximately M/N (3) optical signals will be called "optical mux groups" or simply "mux groups" hereinafter. One mux group on intra-office fiber interconnection 271a remains inside the primary terminal 210 for further processing while the other mux groups on intra-office fiber interconnections 271b-d exit for distribution to distinct locations, such as CPE 290v-x.

The mux group on fiber interconnection 271a is transmitted from fine demux 265 to coarse demux 267. Coarse demux 267 demuxes the approximately M/N (3) optical signals into individual optical signals and transmits the individual signals to transponders 260a-c via output fiber connections 263a-c. Transponders 260a-c convert the individual LH format signals into optical signals for transmission on intra-office optical fibers 251x-1, 251x-2, and 251x-3. The transmitted optical signals are suitable for use by CPEs 290s-u, and therefore the primary terminal 210 serves as the interface device for the local traffic (optical signals) intended for CPEs 290s-u. As shown by the ellipsis, there may be a plurality of CPEs 290 connected to any one of the transponders 260a-c.

For the delivery of remote traffic (optical signals) to remote CPE 290v-x, fine demux 265 transmits the mux groups on intra-office fiber interconnections 271b-d to metro fiber 252. The optical mux groups are transported from metro fiber 252 to extension terminals 220i-k via geographically distinct fiber interconnections 271e-i. Secondary terminals 220i-k demux the optical mux groups into individual optical signals and transmit the individual signals to CPEs 290v-x via intra-office fibers 251z-1, z-3, and z-5. As shown by the ellipsis, there may be a plurality of CPEs connected to any one of the extension terminals 220i-k.

The optical signals, being in full duplex, also flow in a direction opposite to that just described and in a similar way. Individual optical signals that originate from CPE 290v-x are transmitted to extension terminals 220i-k via intra-office optical fibers 251z-2, z-4, z-6. Secondary terminals 220i-j mux the optical signals into optical mux groups and transmit the mux groups to metro fiber 252 via fiber interconnections 271f, 271h, and 271j. The optical mux groups propagating on metro fiber 252 are transmitted to fine mux 266 via fiber interconnections 271f-h. The optical mux groups are muxed into one mux group by fine mux 266. Fine mux 266 transmits a signal containing the mux group to output amplifier 256 via fiber 261b. Output amplifier 256 then amplifies the signal for transmission on intra-office fiber 251w-1 to core fiber 250.

Similarly, optical signals originating from CPEs 290s-u flow in the Z-A direction through transponders 260a-c via intra-office fiber 151y-1, 151y-2 and 151y-3. Transponders 260a-c convert the individual optical signals to a LH format and send the converted signals to coarse mux 268 via output fiber connection 263d-f. Coarse mux 268 muxes the converted signals together into an optical mux group and transmitts the optical mux group to fine mux 266 via fiber interconnection 271e. The optical mux groups propagating on fiber interconnections 271e-h are muxed into one mux group by fine mux 266. Fine mux 266 transmitts the signal containing the mux group to output amplifier 256 via fiber 261b. Output amplifier 256 then amplifies the signal for transmission on intra-office fibers 251w-I to core fiber 250. The combination of primary terminal 210 and extension terminals 220i-k form a system of distributed terminals, which is a preferred embodiment of the present invention.

Figure 5:
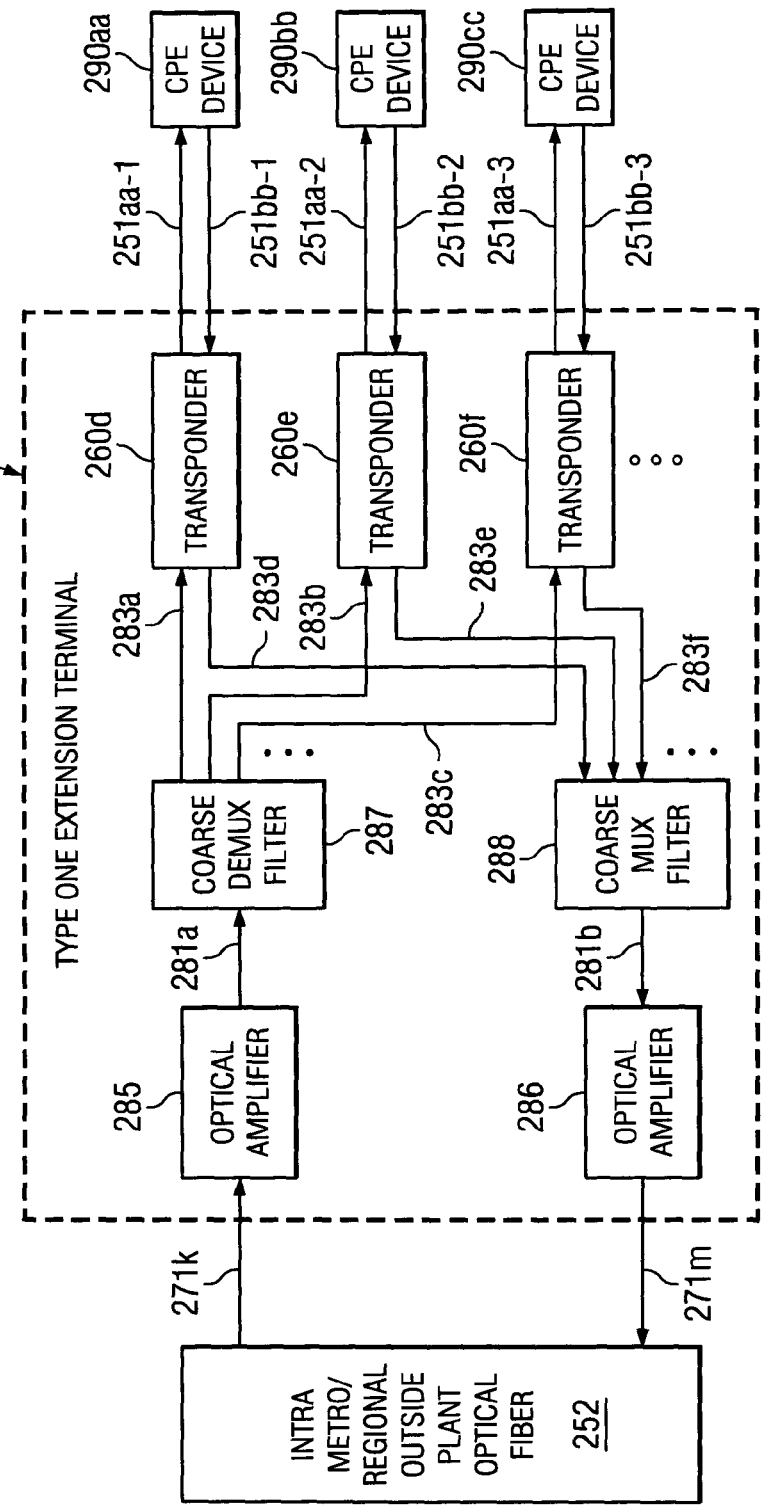
FIG. 5 is a block diagram of a type one extension terminal for use in the present invention.

In FIG. 5, the preferred embodiment of a type one extension terminal 220 is shown. A mux group containing approximately M/N, for example 3, optical signals is propagated from metro fiber 252 (shown as a block) to terminal 220 via fiber interconnection 271k. The mux group traverses terminal 220 receiving amplifier 285 which may be or may not be the same type of amplifier as receiving amplifier 255 in primary terminal 210, FIG. 4. Terminal 220 receiving amplifier 285 amplifies the incoming approximately M/N (3) multiplexed optical WDM or DWDM signals from 271k to a known level so the signals have enough optical power to be transmitted to the other components in type one extension terminal 220 and connecting devices such as CPE 290aa-cc. The approximately M/N (3) multiplexed optical signals are transmitted from extension terminal receiving amplifier 285 to extension terminal coarse demux 287 via extension terminal interconnection 281a. Secondary terminal coarse demux 287 demuxes the approximately M/N (3) multiplexed optical signals into individual optical signals for transmission to transponders 260d-f via extension terminal output fiber connections 283a-c. Transponders 260d-f are the same type of transponders as transponders 260a-c in FIG. 4.

Transponders 260d-f convert the LH format optical signals on extension terminal output fiber connections 283a-c into signals suitable for use by CPEs 290aa-cc. Transponders 260d-f are connected to CPE 290aa-cc via intra-office fibers 251aa-1, 251aa-2 and 251aa-3.

Terminal 220 serves as the interface device for the local traffic (optical signals) intended for CPE 290aa-cc. Intra-office fibers 251aa-1, 251aa-2 and 251aa-3 are usually physically co-located with terminal 220, but they may incorporate long reach capability including optical amplifiers to connect to an individual port on a remote CPE 290 via an intra-office fiber.

The full duplex optical signals also flow in the Z-A direction, from CPEs 290aa-cc through intra-office fibers 251bb-1, 251bb-2 and 251bb-3 to transponders 260d-f. Transponders 260d-f convert the signal formats used by CPEs 290aa-cc to a LH format. The converted LH format signals are sent to extension coarse mux 288 via extension terminal output fiber connections 283d-f. Secondary terminal coarse mux 288 combines the optical signals into an optical mux group and transmits the optical mux group to optical amplifier 286 via extension terminal interconnection 281b. The mux group is amplified by terminal 220 transmitting optical amplifier 286 for propagation along fiber interconnection 271m to metro fiber 252 and on to a primary terminal 210 (FIG. 4).

The preferred embodiment of a type one extension terminal 220 is capable of transmitting and receiving signals from primary terminal 210 from distances on the order of but possibly even larger than 100 km. For distances much larger than 100 km a stand-alone optical amplifier or chain of such devices can be inserted between the extension terminals and the primary terminal.

Figure 6:
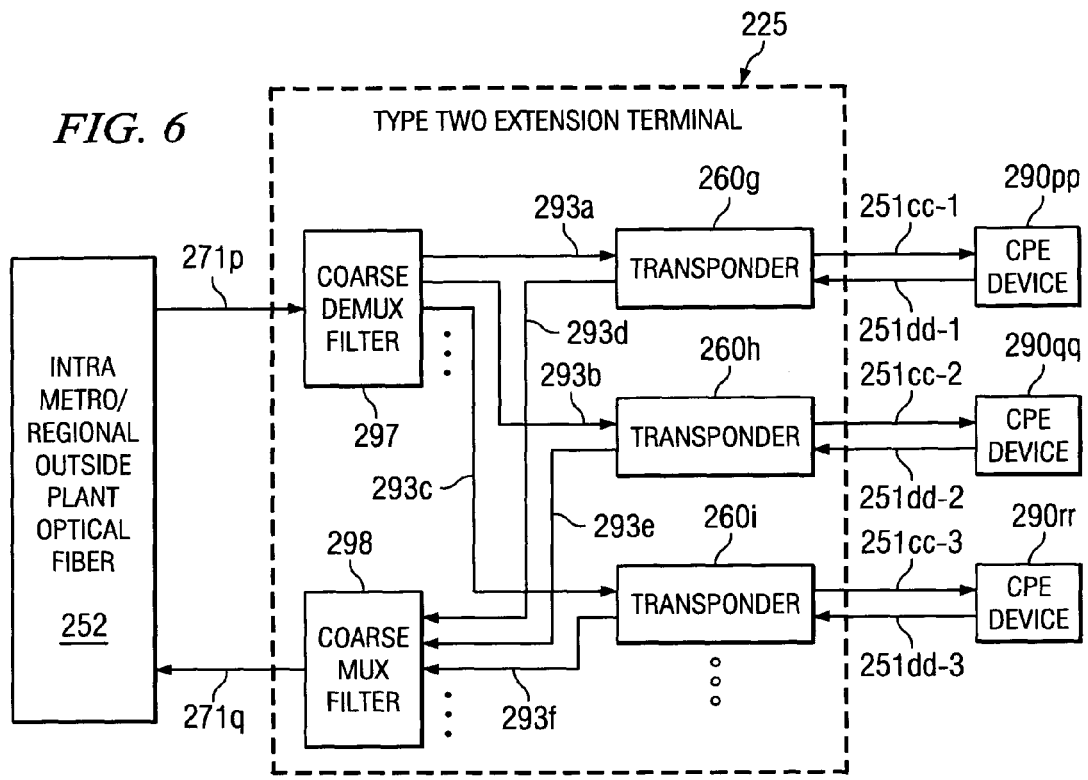
FIG. 6 is a block diagram of a type two extension terminal for use in the present invention.

A type two extension terminal 225 is depicted in FIG. 6. Terminal 225, can be used for short distance connections, of the order of 5 km or less, that require a physical separation between the primary terminal 210 and multiple CPEs. The primary difference between a type two extension terminal 225 and type one extension terminal 220 is that receiving optical amplifier 285 and transmitting amplifier 286 are not found in type two terminal 225. With the exception of the optical amplifiers, the signal propagation is the same to that described for type one extension terminal 220.

In the A-Z direction, an optical mux group containing approximately M/N optical signals are propagated from metro fiber 252 (shown as a block) to type two extension terminal 225 via fiber interconnection 271*p*. The optical mux group propagates to short extension coarse demux 297. Coarse demux 297 demuxes the approximately M/N (3) optical signals into individual optical signals and transmits the individual signals to transponders 260*g-i* via terminal output fiber connections 293*a-c*. Transponders 260*g-i* are the same type of transponders 260*d-f* as shown in FIG. 5.

Transponders 260*g-i* convert the LH format optical signals on output fiber connections 293*a-c* into signals suitable for use by CPEs 290*pp-rr*. Transponders 260*g-i* are connected to CPEs 290*pp-rr* via intra-office fibers 251*cc*-1, 251*cc*-2 and 251*cc*-3.

Terminal 225 can also serve as the interface device for the local traffic (optical signals) intended for CPE 290*pp-rr*. Intra-office fibers 251*cc*-1, 251*cc*-2 and 251*cc*-3 are usually physically co-located with terminal 225, but they may incorporate long reach capability including optical amplifiers to connect to an individual port on a remote CPE 290 via intra-office fiber 251.

The full duplex optical signals also flow in the Z-A direction from CPE 290*pp-rr* through intra-office fibers 251*dd*-1, 251*dd*-2 and 251*dd*-3 to transponders 260*g-i*. Transponders 260*g-i* convert the optical signal formats from that used by CPEs 290*pp-rr* to a LH format. The converted LH format signals are sent to terminal coarse mux 297 via terminal output fiber connections 293*d-f*. Coarse mux 298 combines the optical signals into an optical mux group for propagation along fiber interconnection 271*q* to metro fiber 252 and on to primary terminal 210.

In both terminal 220 and terminal 225, coarse demux 287, terminal coarse demux 297, coarse mux 288, and coarse mux 298 may perform the function of attenuating the individual optical signals. In this way, the invention can launch or detect the appropriate optical powers without the need of gain equalization provided by optical amplifiers. Furthermore, the attenuation function in extension terminal coarse demux 287 and extension terminal coarse mux 288 alleviate the need for tightly controlled gain equalization in the extension terminal receiving optical amplifier 285 and transmitting optical amplifier 286 thereby lowering the cost.

Figure 7:
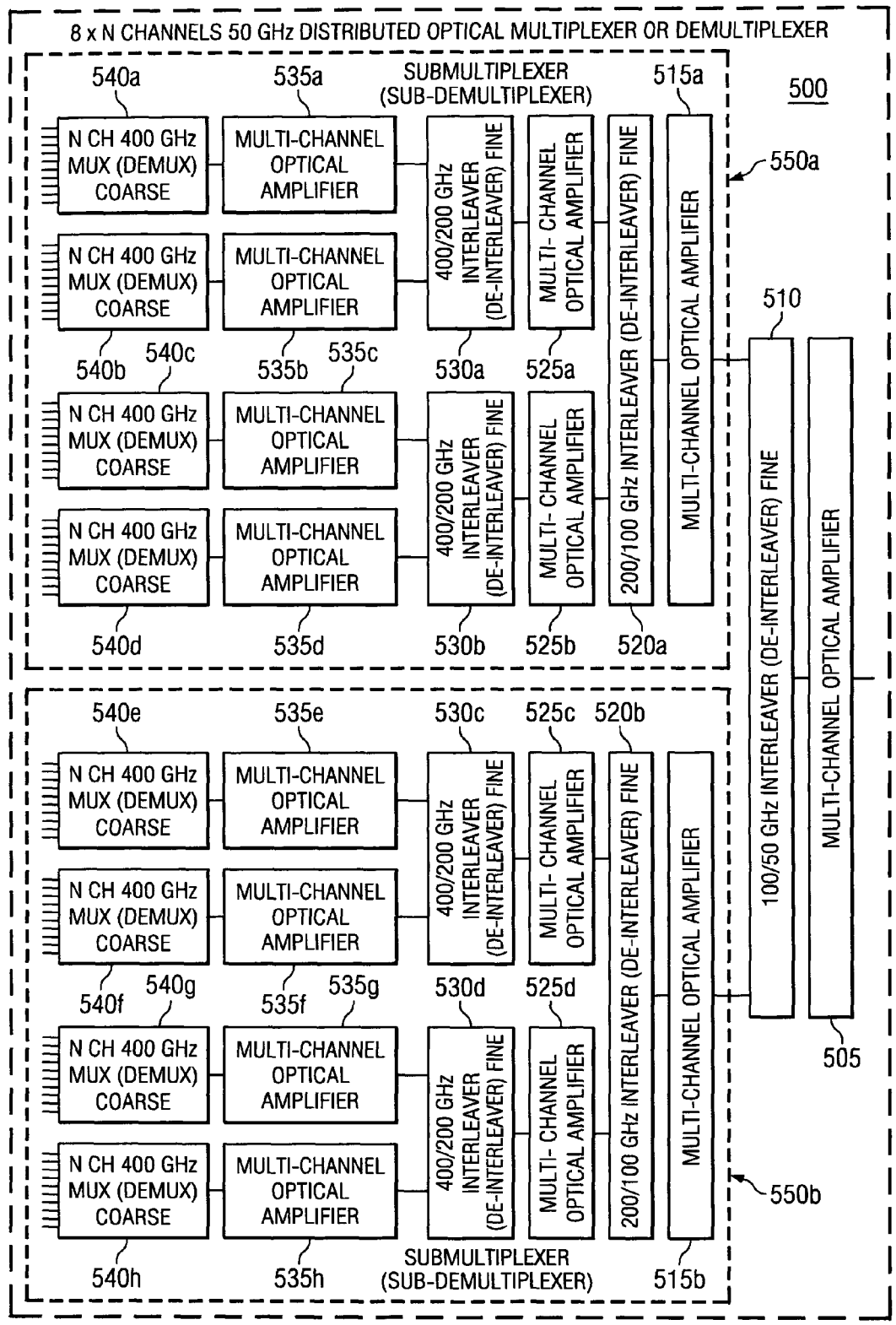
FIG. 7 is a block diagram showing a multiplexer-demultiplexer architecture based on optical interleaver and deinterleaver filters for use in the present invention.

FIGS. 7, 8, 9*a*, 9*b*, 10*a* and 10*b* depict various embodiments of mux and demux architectures which constitute a part of the invention. In FIG. 7, mux 500 is made up of two submultiplexers 550*a* and 550*b*. Submuxers 550*a* and 550*b* are capable of taking four times N optical signals at different wavelengths and combining them onto one output fiber connection 515*a* and 515*b*. N can be any number; for example, 10 as shown in FIG. 7. Mux 500 is capable of taking 8×N (10) optical signals at different wavelengths and combining them onto one output optical connection 505. Thus, the architecture is scaleable up or down in the number of wavelengths, for example a 50125 GHz interleaver may be placed in conjunction with two muxs 500 to form a 16×N multiplexer unit.

The function of an optical interleaver is to combine a "comb" of optical wavelengths consisting of even and odd numbered wavelengths ordered by integers as a monotonically increasing sequence with wavelength or frequency of the optical carrier. The function of an optical de-interleaver is to separate a "comb" of optical wavelengths consisting of even and odd numbered wavelengths ordered as before. Specific interleaver or de-interleaver device implementations are known in the art and will not be described further. Interleavers known in the art and can be obtained from, for example, JDS Uniphase, model number IBC-LW1D00310.

In what follows, the muxing function will be described along with the demuxing function that utilizes the same basic architecture and connectivity. Demuxing is described in parentheses. In the A-Z direction, Z-A in parentheses, signals enter (leave) mux 500 through a set of 400 GHz filters 540*a-h*, known in the art as optical thin film filters or layered dielectric optical filters and available from JDS Uniphase as model number DWS-2F3883P20.

Filters 540*a* and 540*b* mux (demux) the received N (10) optical signals together (apart) into (from) a "comb" of wavelengths separated by 400 GHz and connected to 400/200 GHz interleaver 530*a* by fiber connections 535*a* and 535*b*. Because an interleaver for signals in the A-Z direction is also a deinterleaver for signals in the Z-A direction, the term interleaver will be used to describe both an interleaver and deinterleaver. Similarly, 400 GHz filter pairs 540*c* and 540*d*, 540*e* and 540*f*, and 540*g* and 540*h* mux (demux) together (apart) the received optical signals into (from) a "comb" of wavelengths separated by 400 GHz. The filter pairs 540*c* and 540*d*, 540*e* and 540*f*, and 540*g* and 540*h* are in communication with 400/200 GHz interleavers 530*b*, 530*c* and 530*d*, respectively, via 400/200 GHz fiber connections 535*c-h*, respectively. 400/200 GHz interleavers 530*a-d* combine (separate) optical signals from (for) filters 540*a-h* into (from) a single "comb" of wavelengths separated by 200 GHz. The combined (separated) output (input) is transmitted (received) to (from) 200/100 GHz interleaver 520*a* via 200/100 GHz fiber connection 525*a* and 525*b* where they are combined (separated) into (from) a single "comb" of wavelengths 100 GHz apart. Similarly, output from 530*c* and 530*d* propagate via fiber connection 525*c* and 525*d* to (from) interleaver 520*b* where they are combined (separated) into (from) a single "comb" of wavelengths 100 GHz apart. Finally, the output (input) "combs" of interleavers 520*a* and 520*b* are transmitted to (from) 100/50 GHz interleaver 510 via 100/50 fiber connections 515*a* and 515*b*. 100/50 interleaver 510 combines (separates out) the single comb of wavelengths to form (from) composite optical connection 505 made up of a comb of wavelengths 50 GHz apart.

In reference to FIG. 4, primary terminal 210 is shown to be composed of a coarse mux 268, a coarse demux 267, a fine mux 266, and a fine demux 265. The fine demux 265 and fine mux 266 coincide with the preferred embodiment in FIG. 7 of the combination of 100/50 GHz interleavers 510, 200/100 GHz interleavers 520*a-b*, and 400/200 GHz interleavers 530*a-d*. The coarse demux 267 and coarse mux 268 coincide with the preferred embodiment in FIG. 7 of 400 GHz filters 540*a-h*. The coarse mux 288 and coarse demux 287 in the extension terminals of FIG. 5 and coarse mux 298 and coarse demux 297 of FIG. 6 also coincide with 40 Ghz filters 540*a-h*. Optical connection 505, 100/50 fiber connections 515*a-d*, 200/100 fiber connections 525*a-c*, and fiber connections 535*a-h* may function as simple fiber jumpers or optical amplifiers or optical attenuators or some combination thereof to achieve required fiber distances between the various stages of a distributed terminal.

Figure 8:
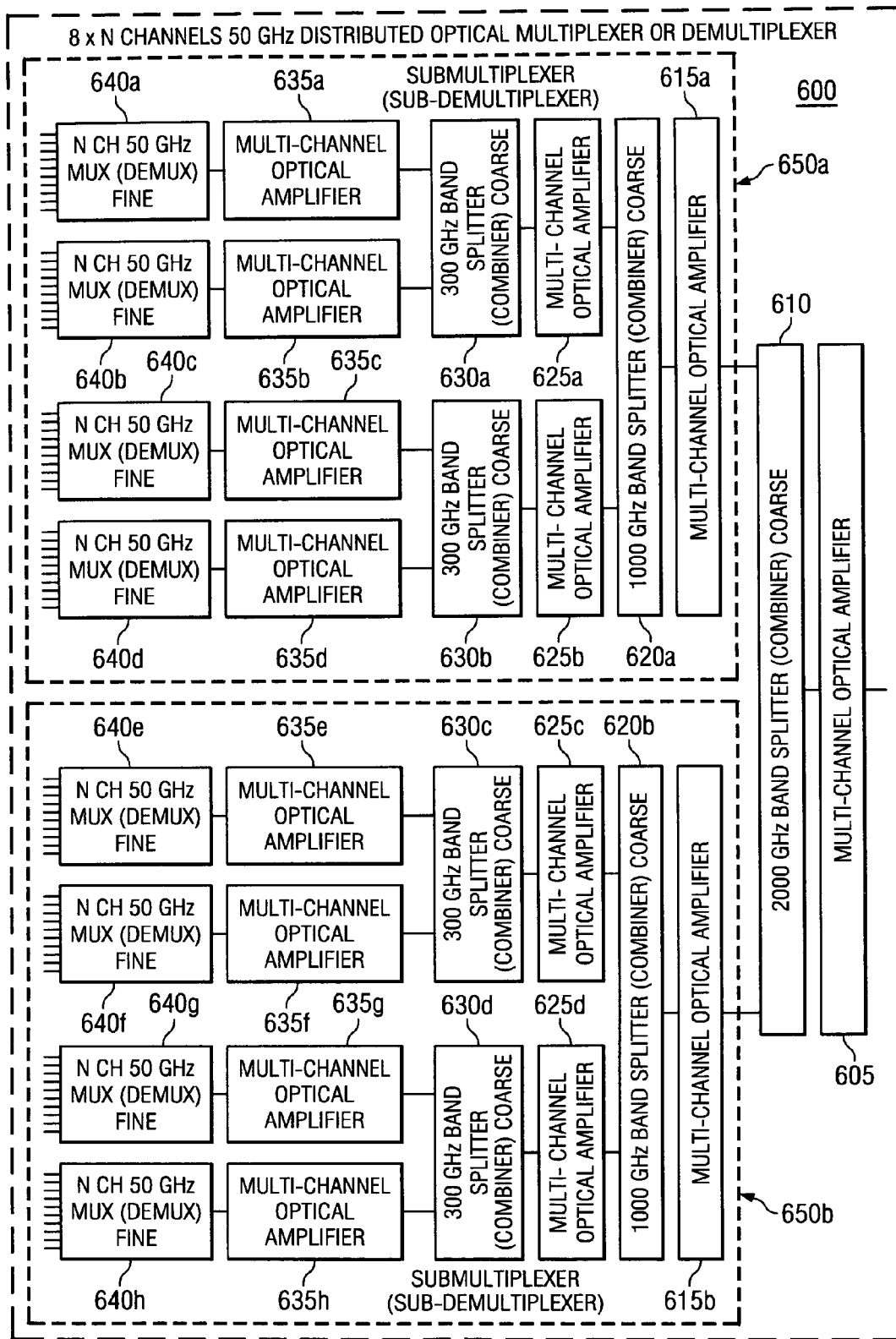
FIG. 8 is a block diagram showing a multiplexer-demultiplexer architecture based on banded DWDM filters for use in the present invention.

FIG. 8 indicates an alternate embodiment of a mux and demux structure. Mux/demux 600 comprises two submuxs 650*a* and demuxs 650*b*. Because mux/demux 600 comprises two submux 650*a* and demux 650*b* pairs, mux/demux 600 is capable of taking 8×N optical signals (10 are shown in FIG. 8) at different wavelengths and combining them onto one output/input connection 605. Because submux 650*a* and demux 650*b* are capable of taking four times N optical signals at different wavelengths and combining them onto one 2000 GHz fiber connection 615a and 615b, the architecture is scaleable up or down in the number of wavelengths. For example, a 4000 GHz Band combiner may be placed in conjunction with two mux/demuxes to form a 16×N (10) multiplexer unit.

The function of an optical band splitter/combiner is to split/combine a specified band of optical wavelengths consisting of tightly spaced optical wavelengths of typical separation 50 GHz or 25 GHz into or out of two coarse bands of such wavelengths. Specific band splitters or band combiner device implementation are well known in the art and not described further. Band filtering devices can be obtained from, for example, Oplink Corporation model number CR000001111.

In the A-Z direction, signals enter mux/demux 600 through a set of fine 50 GHz filters 640a-h, known in the art. 50 GHz filters 640a-h may also be 25 GHz filters also known in the art. Two examples of fine 50 GHz filters 640 are the arrayed waveguide filters and layered dielectric optical filters available as, for example, JDS Uniphase model numbers AWG-5NBUC003T and DWM-5F8DSXXX2, respectively.

Starting with fine 50 Hz filter 640a and 640b, the N(10) optical signals are muxed together into a band of wavelengths contained within about 500 GHz and transmitted to 500 GHz band combiner 630a via 500 GHz fiber connections 635a and 635b. Similarly, fine 56 Hz filter pairs 640c and 640d, 640e and 640f and 640g and 640h mux N(10) optical signals together and transmit the muxed signals to 500 GHz band combiners 630b, 630c and 630d respectively via 500 GHz fiber connections 635c-h respectively. 500 GHz band combiner 630a combines the optical signals from filters 640a and 640b into a single broader band of wavelengths contained within about 1000 GHz. Similarly, 500 GHz band combiners 630b-d combine received optical signals into a single broader band of wavelengths.

The single broader band of wavelengths from extension band combiners 630a and 630b are transmitted to 1000 GHz band combiner 620a via 1000 GHz fiber connections 625a and 625b. 1000 GHz band combiner 620a combines the signals from 500 GHz band combiners 630a and 630b into a single band of wavelengths contained within about 2000 GHz. Similarly, 1000 GHz band combiner 620b combines the wavelengths transmitted from 500 GHz band combiners 630c and 630d via 1000 GHz fiber connection 625c and 625d into a single band of wavelengths. Each 1000 GHz band combiner 620a and 620b transmits the single band of wavelengths to 2000 GHz combiner 610 via 2000 GHz fiber connections 615a and 615b. 2000 GHz combiner 610 combines the received single band of wavelengths into a composite signal band contained within about 4000 GHz. The composite signal band is transmitted on output/input connection 605.

In the Z-A direction, 2000 GHz combiner 610 receives a composite signal band contained within about 4000 GHz on output/input connection 605. Because a combiner for signals in the A-Z direction can also be a splitter for signals in the Z-A direction, the term combiner will be used to describe both a combiner and a splitter. 2000 GHz combiner 610 splits the composite signal into two single band of wavelengths contained within about 2000 GHz. The bands of wavelengths within 2000 GHz are transmitted to 1000 GHz band combiners 620a and 620b via 2000 GHz fiber connections 615a and 615b. 1000 GHz combiners 620a and 620b each separate the single band of wavelengths within 2000 GHz into two single band of wavelengths within about 1000 GHz. The single band of wavelengths within 1000 GHz is transmitted from 1000 GHz combiners 620a and 620b to 500 GHz band combiners 630a-d via 1000 GHz fiber connections 625a-d. 500 GHz band combiners 630a-d each split the single band of wavelengths contained within about 1000 GHz into a single band of wavelengths contained within about 500 GHz. The single band of wavelengths contained within 500 GHz is transmitted from 500 GHz band combiners 630a-d to fine 50 Hz filters 640a-h via 500 GHz fiber connections 635a-h. Fine 50 Hz filters 640a-d demux the single band of wavelengths within 500 GHz into N(10) bands of wavelengths wherein the N(10) wavelengths are transmitted out of mux/demux 600.

The fine filter function performed by 50 Hz filters 640a-h and the coarse filtering functions performed by the combination of 2000 Ghz combiner 610, 1000 GHz combiners 620a and 620b, and 500 GHz band combiners 630a-d can be separated. The coarse and fine filtering functions are reversed in the hierarchy of the interleaver based mux 500. Also, output/input connection 605, 2000 GHz fiber connection 615a and 615b, 1000 GHz fiber connection 625a-h, and 500 GHz fiber connection 635a-h may function as simple fiber jumpers, optical amplifiers, optical attenuators, or some combination thereof to achieve required fiber distances between the various stages of primary terminal 210.

A second alternative embodiment of the multiplexing and demultiplexing function of the present invention is indicated in FIGS. 9a, 9b, 10a and 10b. The embodiment depicts a means of implementing a wavelength tunable system with primary terminals. Beginning with FIG. 9a and 9b tunable demux 700 is composed primarily of first optical splitter 710, second optical splitter 720a and 720b, and third optical splitter 730a-h. Third optical splitter 730a-h is operationally connected to tunable filters 740 via tunable filter fiber connection 731.

In the Z-A direction, first optical splitter 710 receives a composite signal band contained within about 4000 GHz on tunable input connection 705. The embodiment shown is one way of constructing a "tree" whereby a single band of wavelengths transmitted on tunable input connection 705 is demuxed so as separate out groups of wavelengths. The exact nature and combining ratio is not essential. First optical splitter 710 splits the composite signal on tunable input connection 705 into two single bands of wavelengths contained within about 2000 GHz. The bands of wavelengths within 2000 GHz are transmitted to second optical splitters 720a and 720b via first splitter fiber connections 715a and 715b. Second optical splitters 720a and 720b each separate the single bands of wavelengths within 2000 GHz into two single band of wavelengths within about 1000 GHz. The single bands of wavelengths within 1000 GHz are transmitted from second optical splitters 720a and 720b to third optical splitters 730a-h via second splitter fiber connection 725a-h. Third optical splitters 730a-h each split the single band of wavelengths contained within about 1000 GHz into a single band of wavelengths contained within about 500 GHz. The single band of wavelengths contained within 500 GHz is transmitted from third optical splitters 730a-h to tunable filters 740a-x via tunable filter fiber connections 731.

While the order could be greater, in the preferred embodiment, tunable filters 740a-x operate as narrow spectral width bandpass filters with a passband in the order of two and one-half to three times the bandwidth of the carrier frequency; for example, 30 GHz or more for a 10 GHz optical signal. Tunable filters 740a-x are tuned to pass any one of the signals appearing at the outputs of third optical splitters 730a-h. Optical splitters are known in the art, an example being JDS Uniphase model number NEM-221003119. Tunable optical filters are also known in the art, examples being JDS Uniphase model number VCF050 or NORTEL model number MT-15-025. Tunable input connection 705, first splitter fiber connections 715a and 715b, and second splitter fiber connection 725a-h may function as simple fiber jumpers or optical amplifiers or optical attenuators or some combination thereof to achieve required fiber distances between the various stages of a distributed terminal.

Figure 10A:
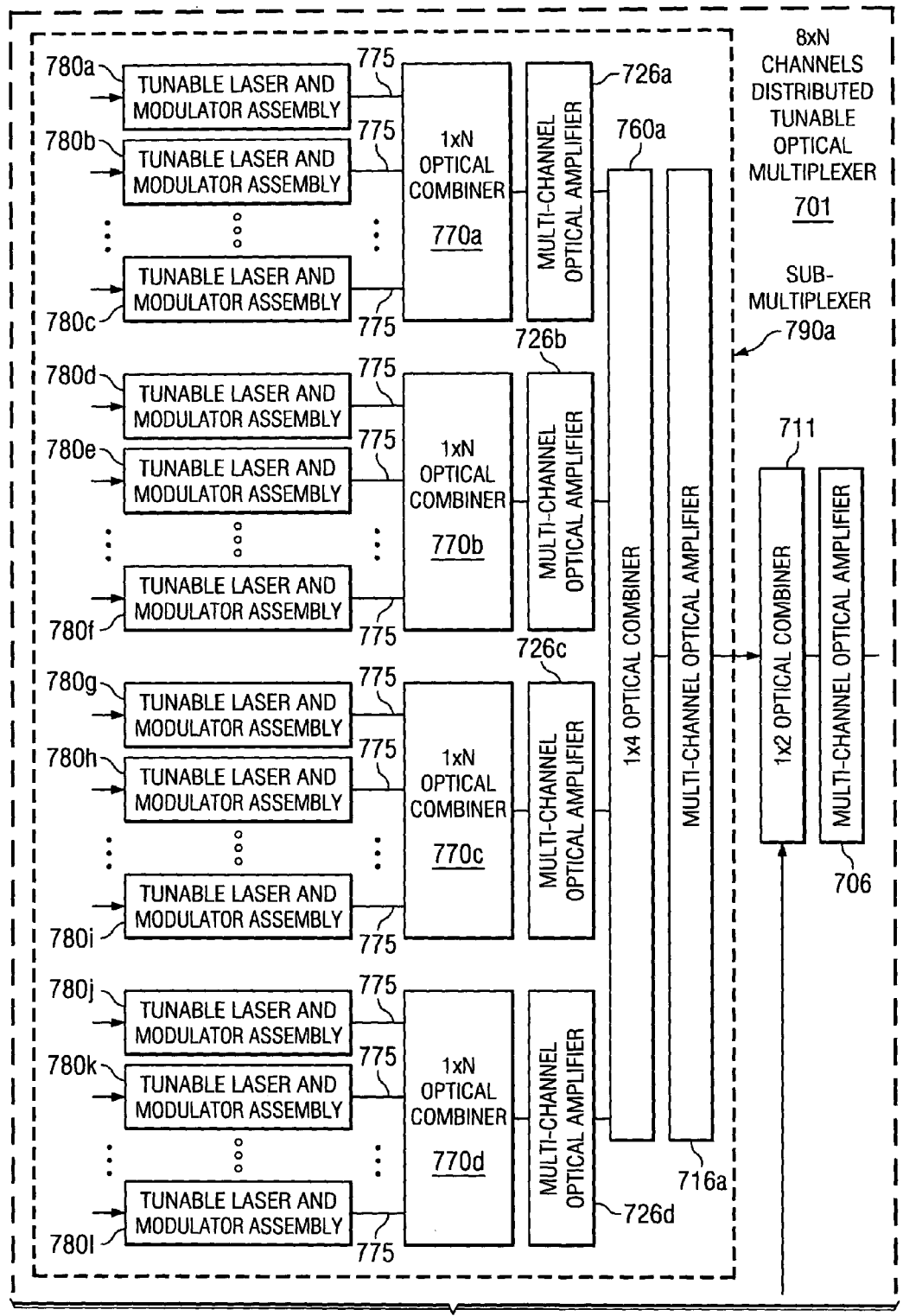
FIGS. 10a and 10b are block diagrams showing a tunable multiplexer for use in the present invention.
Figure 10B:
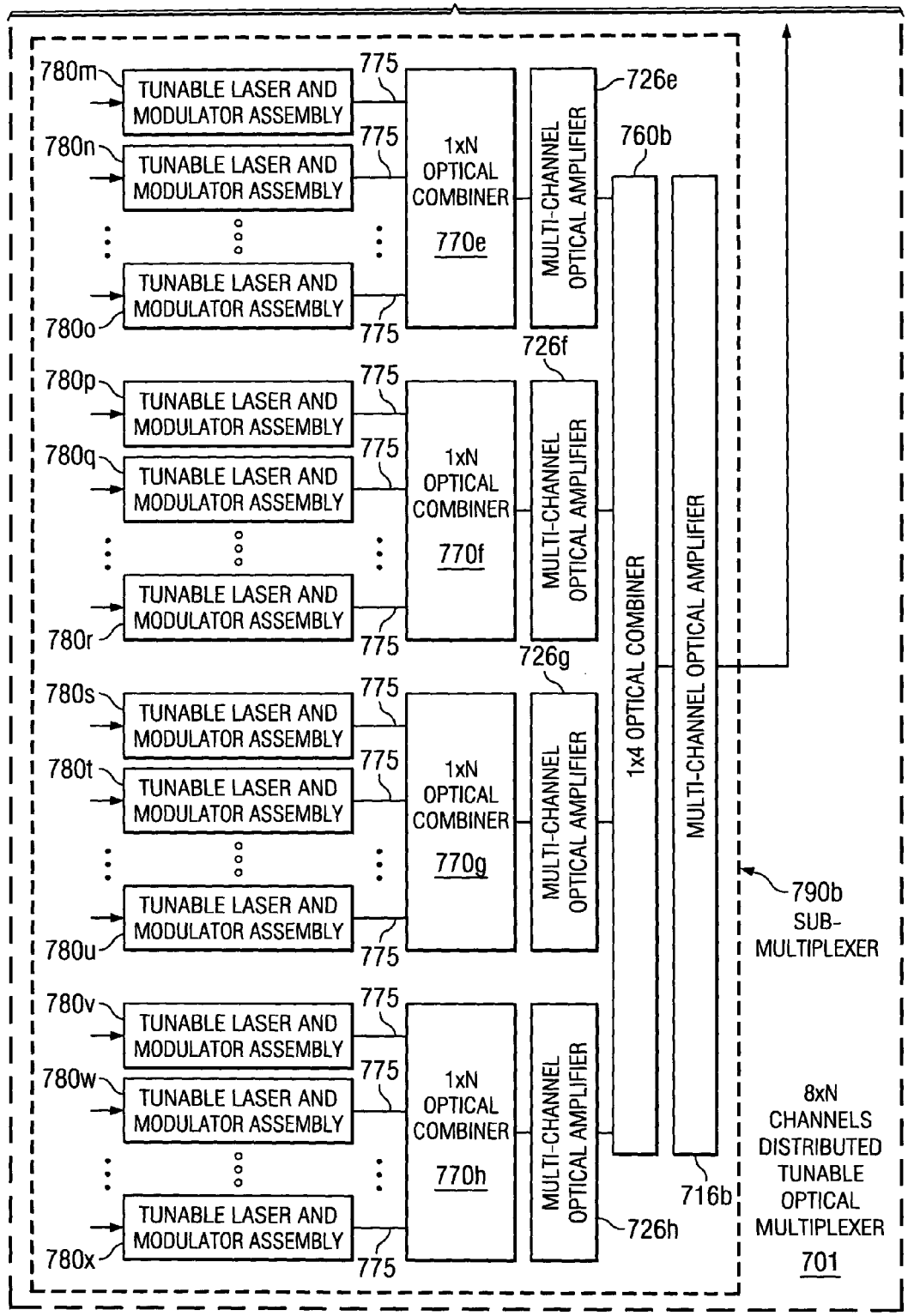

With reference to FIGS. 10a and 10b, tunable mux 701 is composed of first optical combiner 711, second optical combiner 760a and 760b, and third optical combiner 770a-h. Third optical combiner 770a-h is operationally connected to tunable lasers 780a-x. Tunable lasers 780a-x may be narrowly tunable around 200 GHz or broadly tunable, for example, over the entire C or L band of Erbium-doped fiber amplifiers, the spectral width being of the order of 4000 GHz. The laser components may have an optical output power on the order of 20 mW, wavelength stability on the order of 2.5 GHz or better, side-mode suppression ratio on the order of 35 dB, and relative intensity noise (RIN) on the order of −140 dB. Optical combiners are known in the art, an example being JDS Uniphase model number NEM-221003119. Tunable lasers are known in the art, one example, JDS Uniphase CQF3101208-19365.

In the Z-A direction, tunable lasers 780a-x receives a composite signal. The exact nature and combing ratio is not essential, the embodiment shown is one way of constructing a "tree" whereby one or more optical signals generated by one or more different tunable lasers are wavelength muxed so as to appear at output fiber connection 706 as a single band of wavelengths.

Tunable lasers 780 receive a band of wavelengths. The wavelengths are tuned and transmitted to third optical combiner 770a-h via tunable laser fiber connection 775. Third optical combiner 770a-h muxes the received signal from tunable lasers 780a-x into a single band of wavelengths within 500 GHz. The single band of wavelengths within 500 GHz is transmitted to extension optical combiner 760a and 760b via second optical fiber connections 726a-h. Second optical combiners 760a and 760b mux the received single band of wavelengths within 500 GHz into a single band of wavelengths contained within about 1000 GHz. The single band of wavelengths contained within about 1000 GHz is transmitted to first optical combiner 711 via first fiber connections 716a and 716b. Primary optical combiner 711 muxes the received single band of wavelengths within 1000 GHz into a single band of wavelengths within about 2000 GHz. The single band of wavelengths within about 2000 GHz is transmitted over output fiber connection 706.

Output fiber connections 706, first fiber connections 716a and 716b, second fiber connections 726a-h, and tunable laser fiber connection 775 may function as simple fiber jumpers or optical amplifiers or optical attenuators or some combination thereof to achieve required fiber distances between the various stages of a distributed terminal.

Figure 9A:
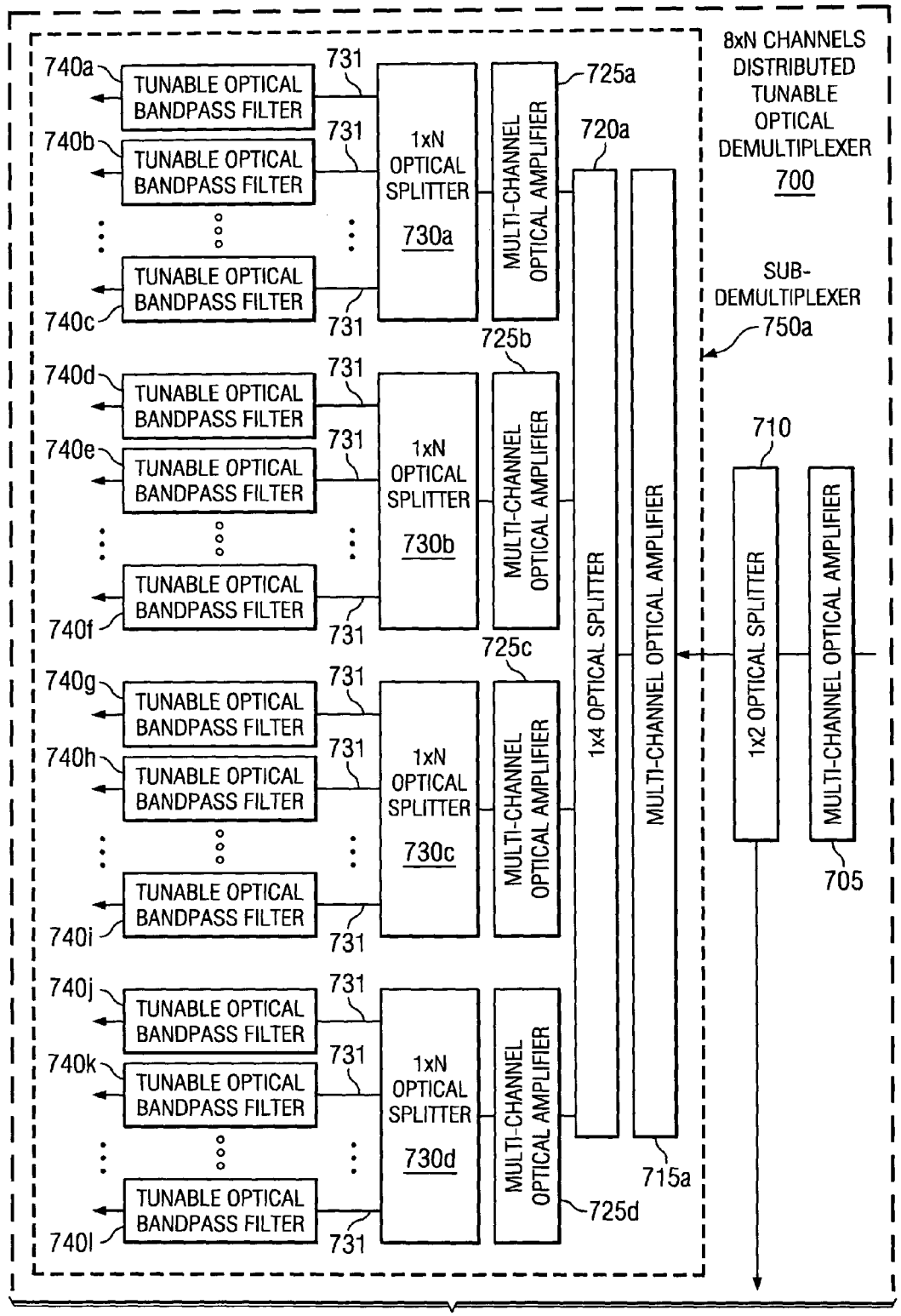
FIGS. 9a and 9b are block diagrams showing a tunable demultiplexer architecture for use in the present invention.
Figure 9B:
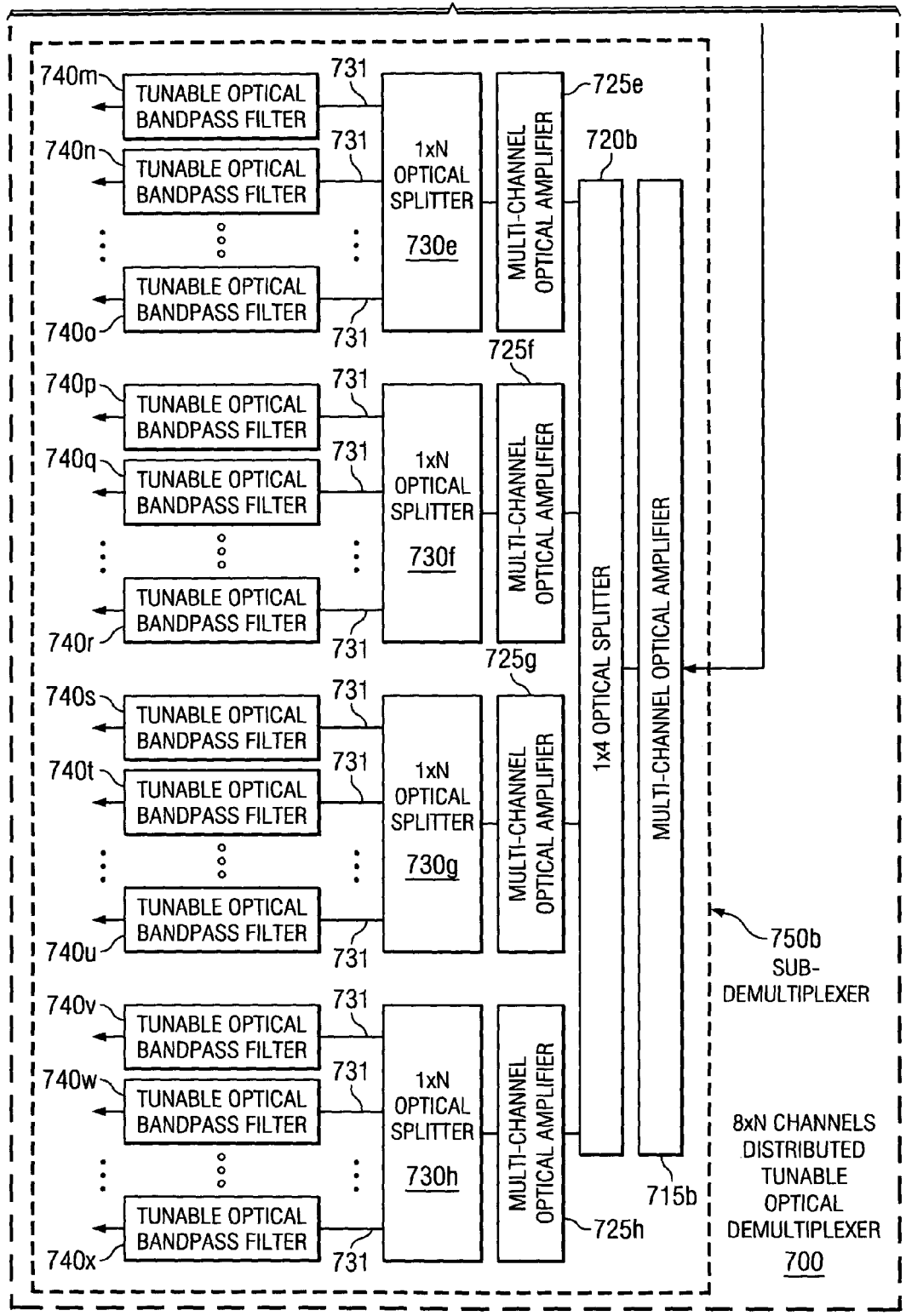

Valid and useful multiplexer and demultiplexer designs can be constructed with combinations of parts shown in FIGS. 7, 8, 9a, 9b, 10a and 10b Fine mux/demux 640a-b from FIG. 8 can individually replace blocks 740a-x as shown in FIGS. 9a and 9b or blocks 780a-x as shown in FIGS. 10a and 10b to form splitter/combiner based fixed filters. This alternate arrangement is advantageous because the cost of components would scale with the deployed bandwidth. Likewise, tunable components 740a-x from FIGS. 9a and 9b and 780a-x from FIGS. 10a and 10b can individually replace the fixed filters 640a-h in FIG. 8 to form banded DWDM based tunable filters. Another advantageous embodiment is that of replacing coarse mux/demux filters 540a-h in FIG. 7 with the tunable filter components 780a-x from FIGS. 9a and 9b and 740a-x from FIGS. 10a and 10b to form a mux and demux, respectively.

Figure 11:
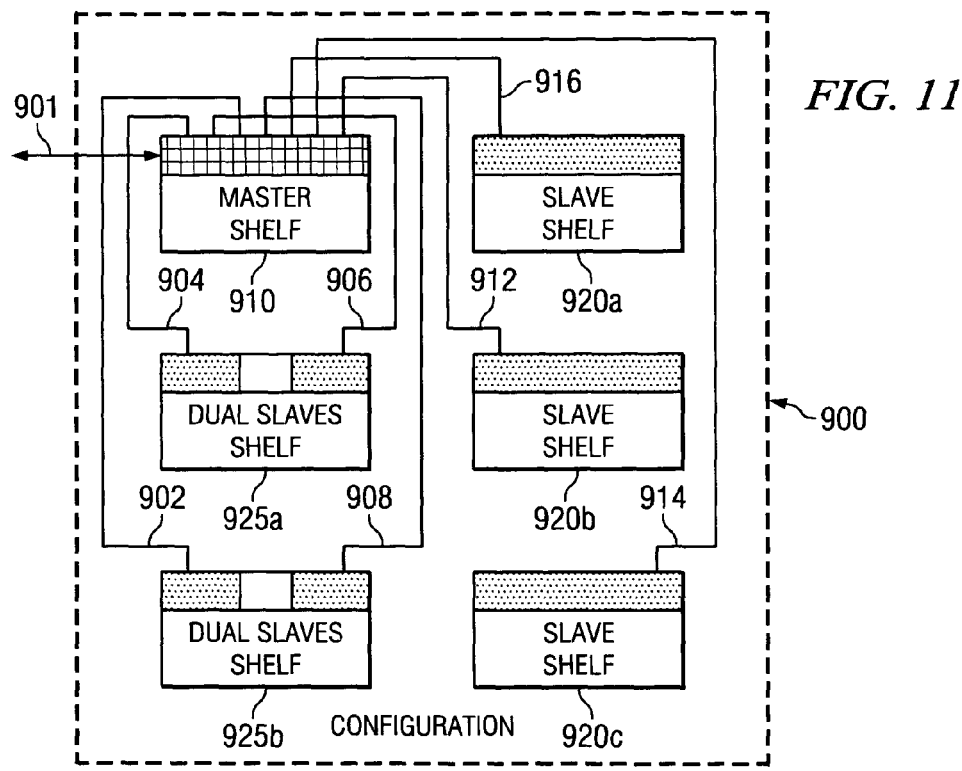
FIG. 11 is a block diagram of shelf configurations according to the present invention.

FIGS. 11 and 12 show different shelf connection configurations of the preferred embodiment that result from integrating the sub-systems of FIGS. 4-7 into a distributed terminal system. Each numbered block in FIGS. 11 and 12 is a self-contained shelf within the optical transmission system: the master terminal shelf 910 embodies the primary terminal 210, the slave 20 shelves 920a-b embody the type one extension terminal 220; and the dual slaves shelf 925a-b embody two type two extension terminals 225 in one unit. In the preferred embodiment, eight optical mux groups are made up of 10 optical signal-carrying wavelengths.

FIG. 11 depicts a star configuration 900, whereby the sub-muxs are both contained within the master terminal shelf 910 along with one local 400 GHz filter. The shelves 910 and 920a-c are interconnected using fiber jumpers 916, 914 and 912. Dual slave shelves 925a-b are interconnected using fiber jumpers 902, 904, 906 and 908.

Figure 12A:
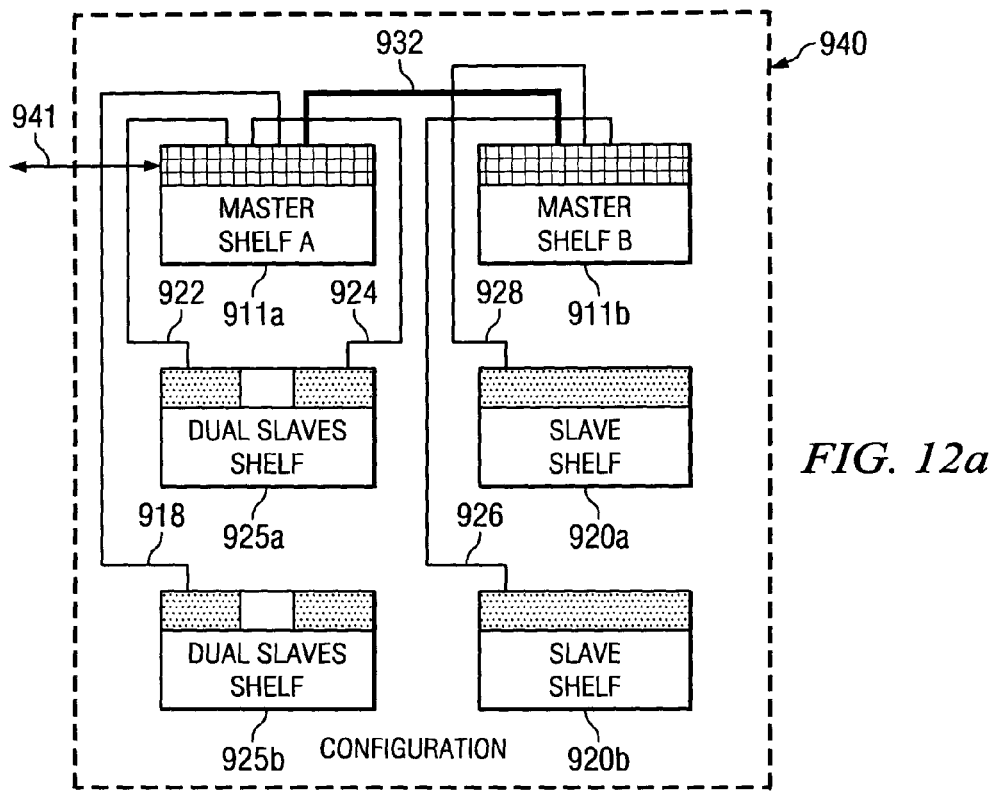
FIGS. 12a and 12b are block diagrams of alternate shelf configurations according to the present invention.

FIG. 12a depicts a second configuration 940 whereby two master shelves 911a and 911b are utilized to distribute the optical mux groups. Shelf 911a, is similar in function to primary terminal 210, and a 100/506 GHz interleaver, sub-mux, and a 400 GHz filter. Shelf 911b, which is also similar in function to primary terminal 210, contains submuxs and a 400 GHz filter. The interconnection between master shelves 911a and 911b is accomplished by fiber interconnection 932 which is a 100/50 fiber connection. The configurations 940 and 960 service 8 optical mux groups or up to 80 optical signal wavelengths in six shelves. Line 941 is an optical input/output connection. Slave shelves 920a and 920b and dual slave shelves 925a and 925b contain the same equipment as described in relation to FIG. 11. Dual slave shelves 925a and 925b are coupled to master shelf via dual slave-to-master connections 918, 922 and 924. Slave shelves 920a and 920b are coupled to master shelf 911b via slave-to-master connections 926 and 928. Dual slave-to-master connections 918 and 922 may be as long as about 5 km in the preferred embodiment. Slave-to-master connections 926 and 928 may be as long as about 100 km without additional optical amplifiers.

Figure 12B:
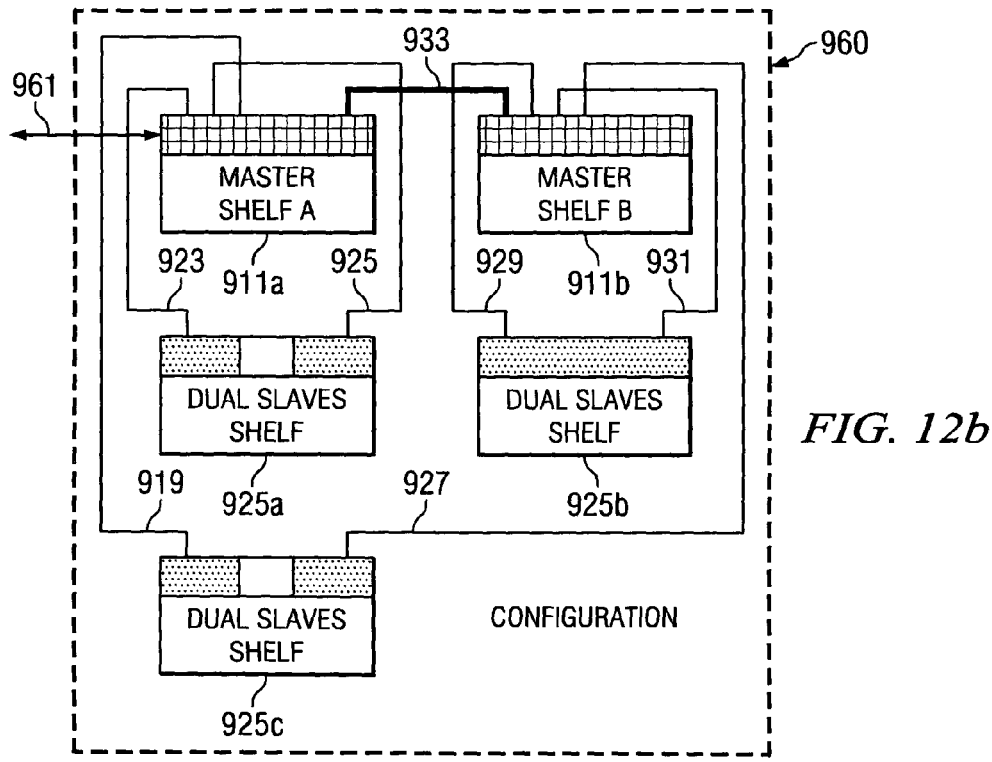

FIG. 12b depicts a third configuration 960 similar to configuration 940 but utilizing only dual slave shelves 925a-c attached to the master shelves 911a and 911b. Configuration 960 achieves the highest system density of the configurations of the preferred embodiment. Two master shelves, 911a and 911b, and three dual slave shelves 925a-c can be used to service all 8 optical mux groups or up to 80 optical signal wavelengths in less than two standard 19 or 23 inch wide seven foot equipment racks. Master shelf 911a is connected to master shelf 911b by connection 933. Master shelf a and b contain the same components as described in relation to FIG. 12a. Master shelf a is connected to dual slave shelf 925a by jumpers 923 and 925. Master shelf 911a is connected to dual slave shelf 925c by jumper 919. Master shelf 911b is connected to dual slave shelf 925b by jumpers 929 and 931. Master shelf 911b is connected to dual slave shelf 925c through jumper 927.

Dual slave shelves 925a, b and c contain the same equipment as described in FIG. 12a. The fiber shelf interconnections 919, 923, 927, 925, 929 and 931 may be as long as about 5 km in the preferred embodiment while the master-to-master fiber connection 933 may be on the order of 100 km (without additional optical amplifiers).

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. An interdomain optical transport system comprising:
   a first transponder photonically connected to a first end user device, wherein the first transponder is configured to receive a first photonic signal from the first end user device and to convert the first photonic signal to a long range photonic signal for transmission over a long haul network;
   a first course optical filter connected to the first transponder;
   a first fine optical filter connected to the first coarse optical filter;
   a second transponder photonically connected to the first transponder via the long haul network and a metro network, wherein the second transponder is further connected to a second end user device,
   wherein the second transponder is configured to receive the long range photonic signal, to convert the long range photonic signal to a second photonic signal, and to transmit the second photonic signal to the second end user device, and
   wherein communication between the first and second end user devices is accomplished without translation between a short range signal format and a long range signal format.

2. The interdomain optical transport system of claim 1, wherein:
   the first transponder is part of a first primary terminal; and
   the second transponder is part of a second primary terminal.

3. The interdomain optical transport system of claim 1, wherein:
   the first transponder is part of a primary terminal; and
   the second transponder os part of an extension terminal.

4. The interdomain optical transport system of claim 3, wherein the second transponder is a bidirectional transponder, and
   wherein the interdomain optical transport system further comprises an optical filter that is connected to the second transponder.

5. The interdomain optical transport system of claim 4, wherein the optical filter includes a banded DWDM filter.

6. The interdomain optical transport system of claim 4, wherein the optical filter is interleaver based.

7. The interdomain optical transport system of claim 4, wherein the optical filter includes a tunable filter.

8. The interdomain optical transport system of claim 7, wherein the tunable filter includes a distributed tunable optical multiplexer and a distributed tunable optical demultiplexer.

9. The interdomain optical transport system of claim 8, wherein the tunable filter includes a splitter.

10. The interdomain optical transport system of claim 1, wherein at least one of the first coarse optical filter or the first fine optical filter includes an interleaver and a tunable filter.

11. The interdomain optical transport system of claim 1, wherein at least one of the first coarse optical filter or the first fine optical filter includes a band filter and a DWDM filter.

12. The interdomain optical transport system of claim 1, wherein at least one of the first coarse optical filter or the first fine optical filter includes a band filter and a tunable filter.

13. The interdomain optical transport system of claim 1, wherein at least one of the first coarse optical filter or the first fine optical filter includes a tunable filter.

14. The interdomain optical transport system of claim 13, wherein the tunable filter includes a distributed tunable optical multiplexer and a distributed tunable optical demultiplexer.

15. The interdomain optical transport system of claim 13, wherein the tunable filter includes a splitter.

16. The interdomain optical transport system of claim 1, wherein the first transponder is a bidirectional transponder, and
   wherein the interdomain optical transport system further comprises an optical amplifier that is connected to the first fine optical filter.

17. The interdomain optical transport system of claim 1, wherein at least one of the first coarse optical filter or the first fine optical filter includes a banded DWDM filter.

18. The interdomain optical transport system of claim 1, wherein at least one of the first coarse optical filter or the first fine optical filter includes an interleaver.

19. The interdomain optical transport system of claim 1, wherein at least one of the first coarse optical filter or the first fine optical filter includes a splitter and a DWDM filter.

20. The interdomain optical transport system of claim 1, wherein at least one of the first coarse optical filter or the first fine optical filter includes a splitter and a tunable filter.

21. The interdomain optical transport system of claim 1, wherein at least one of the first coarse optical filter or the first fine optical filter includes an interleaver and a DWDM filter.

22. The interdomain optical transport system of claim 1, wherein the interdomain optical transport system further comprises:
   a second coarse optical filter that is connected to the second transponder;
   a second fine optical filter that is connected to the second coarse optical filter; and
   an optical amplifier that is connected to the second fine optical filter.

23. The interdomain optical transport system of claim 22, wherein at least one of the second coarse optical filter or the second fine optical filter is a banded DWDM filter.

24. The interdomain optical transport system of claim 22, wherein at least one of the second coarse optical filter or the second fine optical filter is interleaver based.

25. The interdomain optical transport system of claim 22, wherein at least one of the second coarse optical filter or the second fine optical filter includes a tunable filter.

26. The interdomain optical transport system of claim 25, wherein the tunable filter includes a distributed tunable optical multiplexer and a distributed tunable optical demultiplexer.

27. The interdomain optical transport system of claim 1, wherein the first transponder is in a first physical configuration adapted to fit in a first equipment rack, and
   wherein the second transponder is in a second physical configuration adapted to fit in a second equipment rack.

28. The interdomain optical transport system of claim 27, wherein the first and second physical configurations each include at least one master shelf, at least one slave shelf and at least one dual slave shelf.

29. The interdomain optical transport system of claim 27, wherein the first and second physical configurations each include at least two master shelves, at least two slave shelves, and at least two dual slave shelves.

30. The interdomain optical transport system of claim 27, wherein the first and second physical configurations each include least two master shelves and at least three dual slave shelves.

31. The interdomain optical transport system of claim 1, wherein the first transponder Is connected to a third end user device.

32. An interdomain optical transport system comprising:
a first extension terminal connected to a first end user device, wherein the first extension terminal is configured to receive a first photonic signal from the first end user device and to translate the first photonic signal into a long range photonic signal;
a first primary terminal connected to the first extension terminal via a metro network, wherein the first primary terminal is configured to receive and retransmit the long range photonic signal;
an optical transmission path connected to the first primary terminal, wherein the optical transmission path includes at least one optical add drop multiplexer, and wherein the optical transmission path is configured to receive and communicate the long range photonic signal;
a second primary terminal connected to the optical transmission path, wherein the second primary terminal is configured to receive and retransmit the long range photonic signal;
a second extension terminal connected to the second primary terminal and to a second end user device, wherein the second extension terminal is configured to receive and translate the long range photonic signal into a second photonic signal and to transmit the second photonic signal to the second end user device, and wherein communication between the first and second end user devices is accomplished without translation between a short range signal format and a long range signal format;
a third primary extension terminal connected to the at least one optical add drop multiplexer; and
a third extension terminal connected to the third primary terminal.

33. The interdomain optical transport system of claim 32, wherein the second extension terminal is connected to a third end user device.

34. The interdomain optical transport system of claim 32, wherein the first extension terminal is connected to a third end user device.

35. The interdomain optical transport system of claim 32, further comprising a fourth extension terminal connected to the first primary terminal.

36. The interdomain optical transport system of claim 35, wherein the first and fourth extension terminals are each connected to the first end user device.

37. The interdomain optical transport system of claim 32, wherein the first primary terminal is further configured to receive a second long range photonic signal from a fourth extension terminal and to multiplex the second long range photonic signal onto the optical transmission path.

38. The interdomain optical transport system of claim 37, wherein the second primary terminal is further configured to demultiplex the second long range photonic signal from the optical transmission path and to transmit the second long range photonic signal to a fourth primary terminal.

39. The interdomain optical transport system of claim 32, further comprising a fourth extension terminal and a fifth extension terminal, each connected to the first primary terminal.

40. The interdomain optical transport system of claim 39, wherein the fourth and fifth extension terminals are each connected to a third end user device.

41. The interdomain optical transport system of claim 32, wherein the optical transmission path includes at least one optical amplifier.

42. The interdomain optical transport system of claim 32, wherein the optical transmission path includes a broadcast and select architecture.

43. The interdomain optical transport system of claim 32, wherein the third extension terminal is connected to a third end user device.

44. The interdomain optical transport system of claim 32, wherein the first primary terminal includes;
a bidirectional transponder;
an optical filter connected to the bidirectional transponder; and
an optical amplifier connected to the optical filter.

45. The interdomain optical transport system of claim 44, wherein the optical filter is a banded DWDM filter.

46. The interdomain optical transport system of claim 44, wherein the optical filter is interleaver based.

47. The interdomain optical transport system of claim 44, wherein the optical filter includes a tunable filter.

48. The interdomain optical transport system of claim 47, wherein the tunable filter includes a distributed tunable optical multiplexer and a distributed tunable optical demultiplexer.

49. The interdomain optical transport system of claim 32, wherein the second primary terminal includes:
a bidirectional transponder; and
an optical filter connected to the bidirectional transponder.

50. The interdomain optical transport system of claim 49, wherein the optical filter includes a banded DWDM filter.

51. The interdomain optical transport system of claim 49, wherein the optical filter includes a splitter and a DWDM filter.

52. The interdomain optical transport system of claim 49, wherein the optical filter includes a splitter and a tunable filter.

53. The interdomain optical transport system of claim 49, wherein the optical filter includes an interleaver and a DWDM filter.

54. The interdomain optical transport system of claim 49, wherein the optical filter includes an interleave and a tuner.

55. The interdomain optical transport system of claim 49, wherein the optical filter includes a band filter and a DWDM filter.

56. The interdomain optical transport system of claim 49, wherein the optical filter includes a band filter and a tunable filter.

57. The interdomain optical transport system of claim 49, wherein the optical filter is interleaver based.

58. The interdomain optical transport system of claim 49, wherein the optical filter includes a tunable filter.

59. The interdomain optical transport system of claim 58, wherein the tunable filter includes at least one splitter.

60. The interdomain optical transport system of claim 58, wherein the tunable filter includes a distributed tunable optical multiplexer and a distributed tunable optical demultiplexer.

61. The interdomain optical transport system of claim 32, wherein the first primary terminal includes:
a bidirectional transponder;
a coarse optical filter connected to the bidirectional transponder;
a fine optical filter connected to the coarse optical filter; and
an optical amplifier connected to the fine optical filter.

62. The interdomain optical transport system of claim 61, wherein at least one of the coarse optical filter or the fine optical filter includes a banded DWDM filter.

63. The interdomain optical transport system of claim 61, wherein at least one of the coarse optical filter or the fine optical filter is interleaver based.

64. The interdomain optical transport system of claim 61, wherein at least one of the coarse optical filter or the fine optical filter includes a tunable filter.

65. The interdomain optical transport system of claim 64, wherein the tunable filter includes a distributed tunable optical multiplexer and a distributed tunable optical demultiplexer.

66. A method for transporting optical signals over an interdomain optical transport system, the method comprising:
receiving a first optical signal from a first end user device at a first extension terminal, the first extension terminal including a first coarse multiplexer and a first coarse demultiplexer;
converting the first optical signal to a first long range optical signal for transmission over a long haul network;
transmitting the first long range optical signal to a second extension terminal via the long haul network and a metro network, the second extension terminal including a second coarse multiplexer and a second coarse demultiplexer;
converting the first long range optical signal to a second optical signal; and
transmitting the second optical signal to a second end user device,
wherein communication between the first and second end user devices is accomplished without translation between a short range signal format and a long range signal format.

67. The method of claim 66, wherein the short range signal format accommodates propagation distances equal to or less than about 80 kilometers, and wherein the long range signal format accommodates propagation distances greater than about 80 kilometers.

68. The method of claim 66, further comprising reducing an operational cost associated with the interdomain optical transport system by communicating between the first and second end user devices without translation between the short range and long range signal formats.

69. The method of claim 68, further comprising increasing a profit from the communication between the first and second end user devices by reducing the operational cost.

70. The method of claim 66, wherein the first and second extension terminals include a first transponder and a second transponder, respectively.

71. The method of claim 66 further comprising:
receiving a third optical signal from a third end user device at the first extension terminal;
converting the third optical signal to a second long range optical signal;
multiplexing the first and second long range optical signals; and
transmitting the multiplexed first and second long range optical signals to the second extension terminal via the metro network.

72. The method of claim 71 further comprising:
demultiplexing the multiplexed first and second long range optical signals;
converting the second long range optical signal to a fourth optical signal; and
transmitting the fourth optical signal to a fourth end user device.

73. The method of claim 66, wherein the first and second optical signals are suitable for use by the first and second end user devices, respectively.

74. An interdomain optical transport system comprising:
a first extension terminal connected to a first end user device, wherein the first extension terminal is configured to receive a first photonic signal from the first end user device and to translate the first photonic signal into a long range photonic signal;
a second extension terminal connected to a second end user device;
a third extension terminal connected to the second end user device;
a first primary terminal connected to the first, second and third extension terminals via at least one metro network, wherein the first primary terminal is configured to receive and retransmit the long range photonic signal;
an optical transmission path connected to the first primary terminal, wherein the optical transmission path is configured to receive and communicate the long range photonic signal;
a second primary terminal connected to the optical transmission path, wherein the second primary terminal is configured to receive and retransmit the long range photonic signal; and
a fourth extension terminal connected to the second primary terminal and to a third end user device, wherein the fourth extension terminal is configured to receive and translate the long range photonic signal into a second photonic signal and to transmit the second photonic signal to the third end user device, and wherein communication between the first and third end user devices is accomplished without translation between a short range signal format and a long range signal format.

75. The interdomain optical transport system of claim 74, wherein the first primary terminal includes:
a bidirectional transponder;
an optical filter connected to the bidirectional transponder; and
an optical amplifier connected to the optical filter.

76. The interdomain optical transport system of claim 75, wherein the optical filter is a banded DWDM filter.

77. The interdomain optical transport system of claim 75, wherein the optical filter is interleaver based.

78. The interdomain optical transport system of claim 75, wherein the optical filter includes a tunable filter.

79. The interdomain optical transport system of claim 74, wherein the first primary terminal includes:
a bidirectional transponder;
a coarse optical filter connected to the bidirectional transponder;
a fine optical filter connected to the coarse optical filter; and
an optical amplifier connected to the fine optical filter.

80. The interdomain optical transport system of claim 74, wherein the second primary terminal includes:
a bidirectional transponder;
an optical filter connected to the bidirectional transponder; and
an optical amplifier connected to the optical filter.

81. The interdomain optical transport system of claim 80, wherein the optical filter is a banded DWDM filter.

82. The interdomain optical transport system of claim 80, wherein the optical filter is interleaver based.

83. The interdomain optical transport system of claim 80, wherein the optical filter includes a tunable filter.

84. The interdomain optical transport system of claim 74, wherein the second primary terminal includes:
- a bidirectional transponder;
- a coarse optical filter connected to the bidirectional transponder;
- a fine optical filter connected to the coarse optical filter; and
- an optical amplifier connected to the fine optical filter.

85. An interdomain optical transport system comprising:
- a first extension terminal connected to a first end user device, wherein the first extension terminal is configured to receive a first photonic signal from the first end user device and to translate the first photonic signal into a long range photonic signal;
- a second extension terminal connected to the first end user device;
- a first primary terminal connected to the first and second extension terminals via at least one metro network, wherein the first primary terminal is configured to receive and retransmit the long range photonic signal;
- an optical transmission path connected to the first primary terminal, wherein the optical transmission path is configured to receive and communicate the long range photonic signal;
- a second primary terminal connected to the optical transmission path, wherein the second primary terminal is configured to receive and retransmit the long range photonic signal; and
- a third extension terminal connected to the second primary terminal and to a second end user device, wherein the third extension terminal is configured to receive and translate the long range photonic signal into a second photonic signal and to transmit the second photonic signal to the second end user device, and wherein communication between the first and second end user devices is accomplished without translation between a short range signal format and a long range signal format.

86. The interdomain optical transport system of claim 85, wherein the first primary terminal includes:
- a bidirectional transponder;
- an optical filter connected to the bidirectional transponder; and
- an optical amplifier connected to the optical filter.

87. The interdomain optical transport system of claim 86, wherein the optical filter is a banded DWDM filter.

88. The interdomain optical transport system of claim 86, wherein the optical filter is interleaver based.

89. The interdomain optical transport system of claim 86, wherein the optical filter includes a tunable filter.

90. The interdomain optical transport system of claim 85, wherein the first primary terminal includes:
- a bidirectional transponder;
- a coarse optical filter connected to the bidirectional transponder;
- a fine optical filter connected to the coarse optical filter; and
- an optical amplifier connected to the fine optical filter.

91. The interdomain optical transport system of claim 85, wherein the second primary terminal includes:
- a bidirectional transponder;
- an optical filter connected to the bidirectional transponder; and
- an optical amplifier connected to the optical filter.

92. The interdomain optical transport system of claim 91, wherein the optical filter is a banded DWDM filter.

93. The interdomain optical transport system of claim 91, wherein the optical filter is interleaver based.

94. The interdomain optical transport system of claim 91, wherein the optical filter includes a tunable filter.

95. The interdomain optical transport system of claim 85, wherein the second primary terminal includes:
- a bidirectional transponder;
- a coarse optical filter connected to the bidirectional transponder;
- a fine optical filter connected to the coarse optical filter; and
- an optical amplifier connected to the fine optical filter.

* * * * *

UNITED STATES PATENT AND TRADEMARK OFFICE
CERTIFICATE OF CORRECTION

PATENT NO. : 7,505,687 B2 Page 1 of 1
APPLICATION NO. : 10/402840
DATED : March 17, 2009
INVENTOR(S) : Pawan Jaggi et al.

It is certified that error appears in the above-identified patent and that said Letters Patent is hereby corrected as shown below:

COL. 19, line 42 (Claim 3), delete "os" and substitute therefor --is--

Signed and Sealed this

Twenty-sixth Day of May, 2009

JOHN DOLL
*Acting Director of the United States Patent and Trademark Office*